United States Patent [19]
Wallace et al.

[11] Patent Number: 5,861,889
[45] Date of Patent: Jan. 19, 1999

[54] THREE DIMENSIONAL COMPUTER GRAPHICS TOOL FACILITATING MOVEMENT OF DISPLAYED OBJECT

[75] Inventors: John R. Wallace; William B. Kellner, both of Ithaca, N.Y.

[73] Assignee: 3D-Eye, Inc., Ithaca, N.Y.

[21] Appl. No.: 634,876

[22] Filed: Apr. 19, 1996

[51] Int. Cl.⁶ .................................................. G06T 3/00
[52] U.S. Cl. ...................... 345/433; 345/437; 345/438; 345/348; 345/976
[58] Field of Search .................................. 395/133, 137, 395/138, 139, 326, 339, 348, 349, 355; 345/121, 126, 433, 437, 438, 439, 326, 339, 348, 349, 355

[56] References Cited

U.S. PATENT DOCUMENTS

| | | | |
|---|---|---|---|
| 4,734,690 | 3/1988 | Waller | 345/427 |
| 5,019,809 | 5/1991 | Chen et al. | 340/815.42 |
| 5,303,337 | 4/1994 | Ishida | 345/419 |
| 5,345,543 | 9/1994 | Capps et al. | 345/437 |
| 5,396,590 | 3/1995 | Kreeger | 345/347 |
| 5,414,802 | 5/1995 | Takamura | 345/419 |
| 5,422,897 | 6/1995 | Wyatt et al. | 372/6 |
| 5,432,894 | 7/1995 | Funaki | 345/419 |
| 5,463,722 | 10/1995 | Venolia | 395/133 |
| 5,511,157 | 4/1996 | Wang | 395/137 |
| 5,513,309 | 4/1996 | Meier et al. | 395/339 |
| 5,515,486 | 5/1996 | Amro et al. | 395/137 |
| 5,524,196 | 6/1996 | Blades | 395/326 |
| 5,588,098 | 12/1996 | Chen et al. | 395/137 |

OTHER PUBLICATIONS

Newton, *Inside Generic CADD,* New Riders Publishing, 1991, pp. 220 and 259–261.

*The Showplace Companion,* Pixar™ Corporation, 1990, pp. 91–116.

Shoemake, K., "Archball: A User for Specifying Three–Dimensional Orientation Using A Mouse", Proceedings Graphic Interface 1992, May 11–15, 1992, pp. 151–156.

Chen et al, "A Study in Interactive 3–D Rotation Using 2–D Control Devices", *Computer Graphics,* vol. 22, No. 4, Aug. 1988, pp. 121–129.

*Primary Examiner*—Stephen S. Hong
*Attorney, Agent, or Firm*—Nixon & Vanderhye, P.C.

[57] ABSTRACT

Method and apparatus are provided for rotating a displayed object, the displayed object appearing on a screen of a display device of a three dimensional computer graphics system. When displayed object object appears on the display screen, a user input device (e.g., mouse) prompts the additional display of an object movement reference frame on the display screen. The object movement reference frame preferably takes the form of a spherical contour line and various "handles" which provide a user-friendly three dimensional spherical depiction. The object movement reference frame is preferably superimposed with respect to the displayed object. The "handles" of the object movement reference frame include a plurality of object image handles which are generally classified as planar handles and knob handles. A "handle set" is comprised of paired or connected object image handles, such as a knob handle connected by a radial connector to a planar handle. The "handles" of the object movement reference frame also include frame handles. The frame handles facilitate, among other things, movement of the sphere relative to the displayed object.

37 Claims, 33 Drawing Sheets

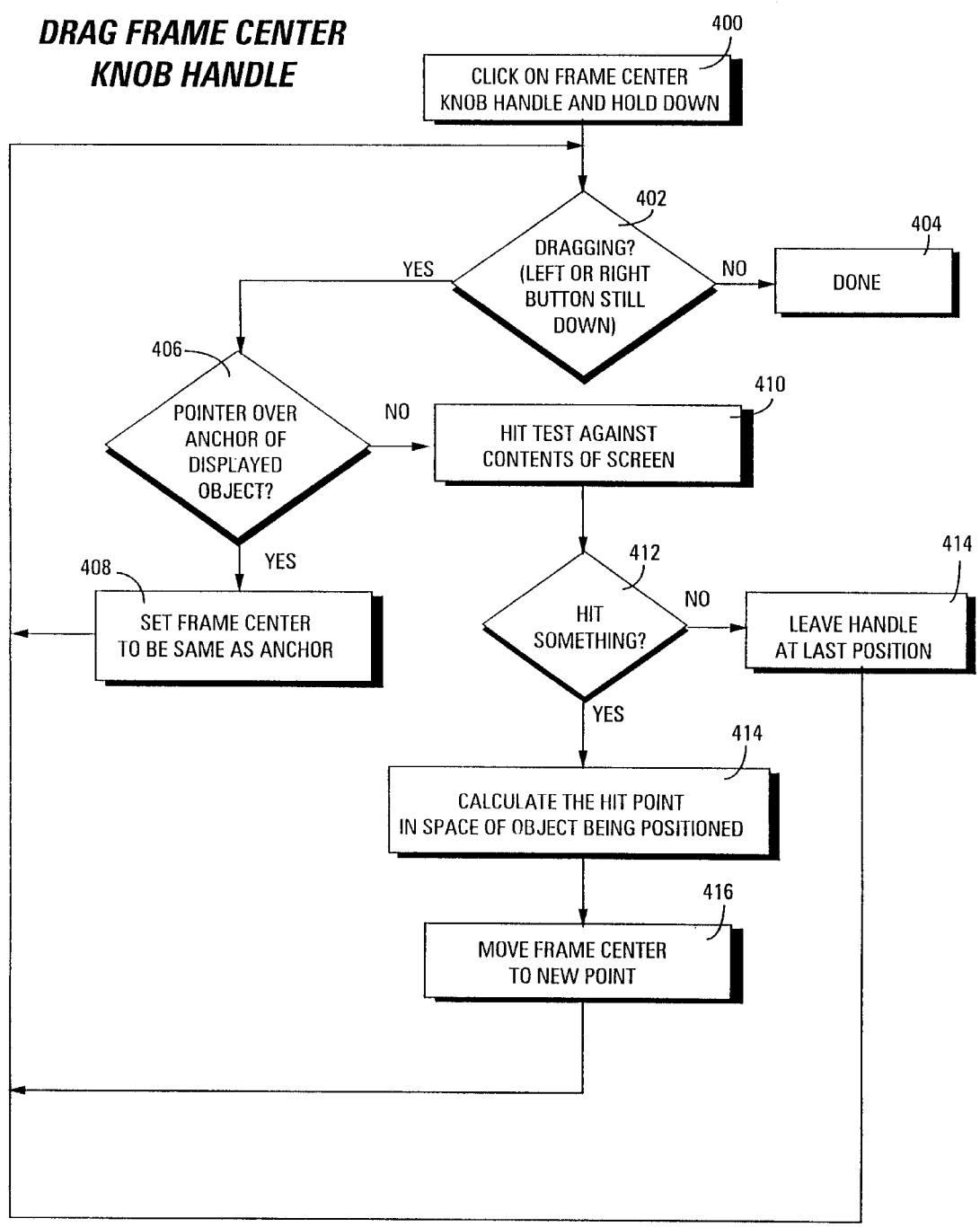

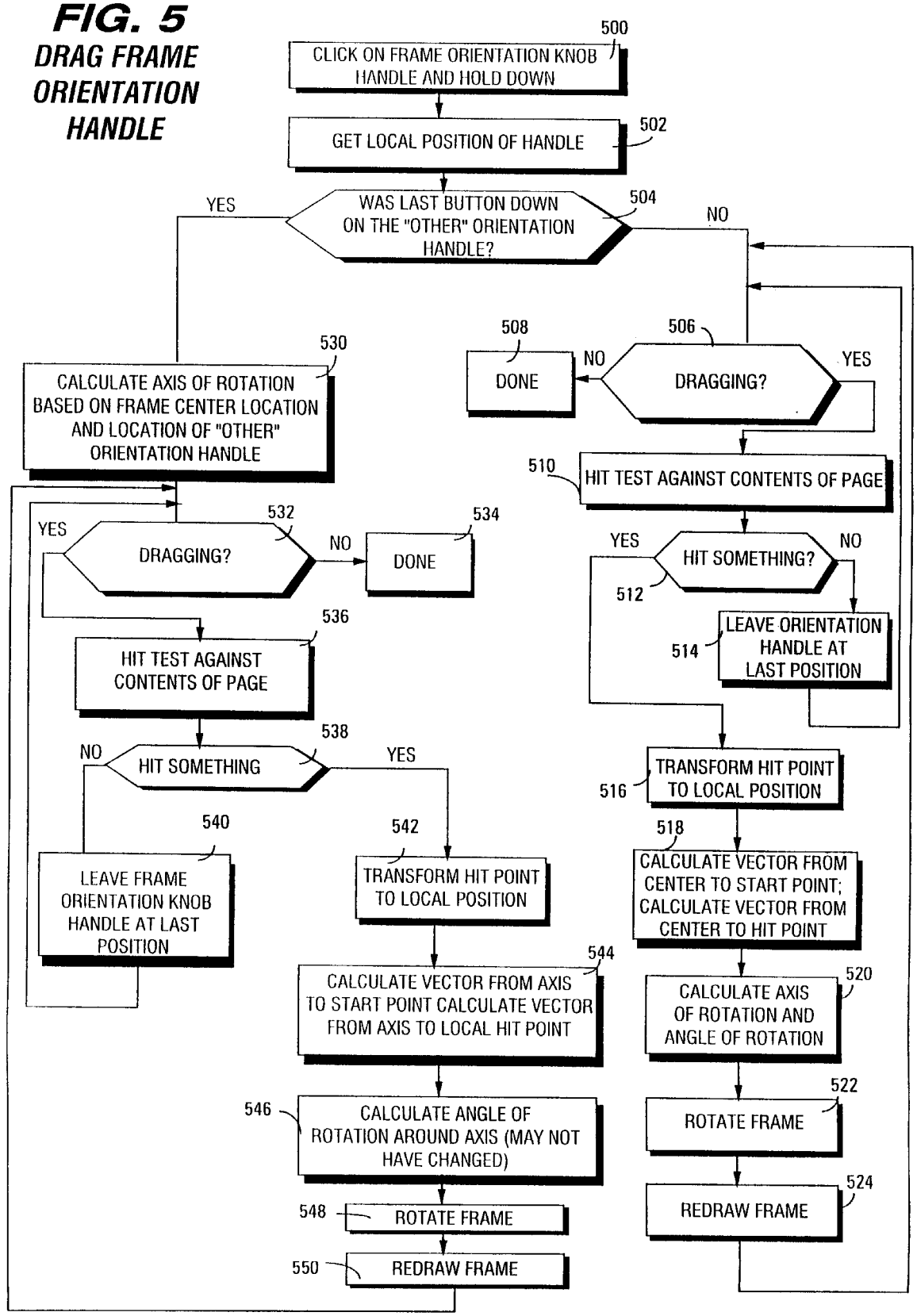

OBJECT PLANAR DRAG

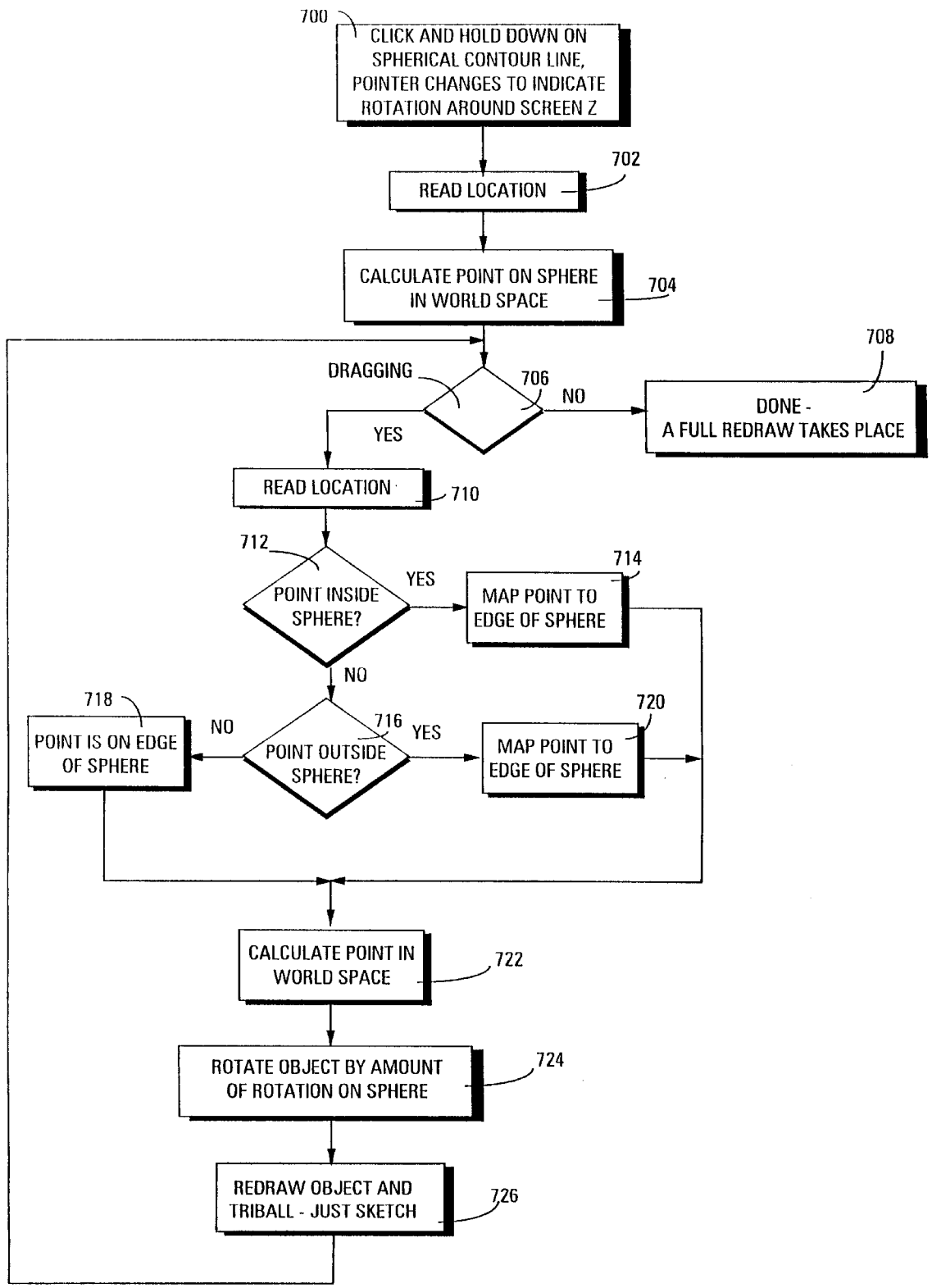
FIG. 7 — OBJECT CONSTRAINED ROTATION AROUND SCREEN Z AXIS

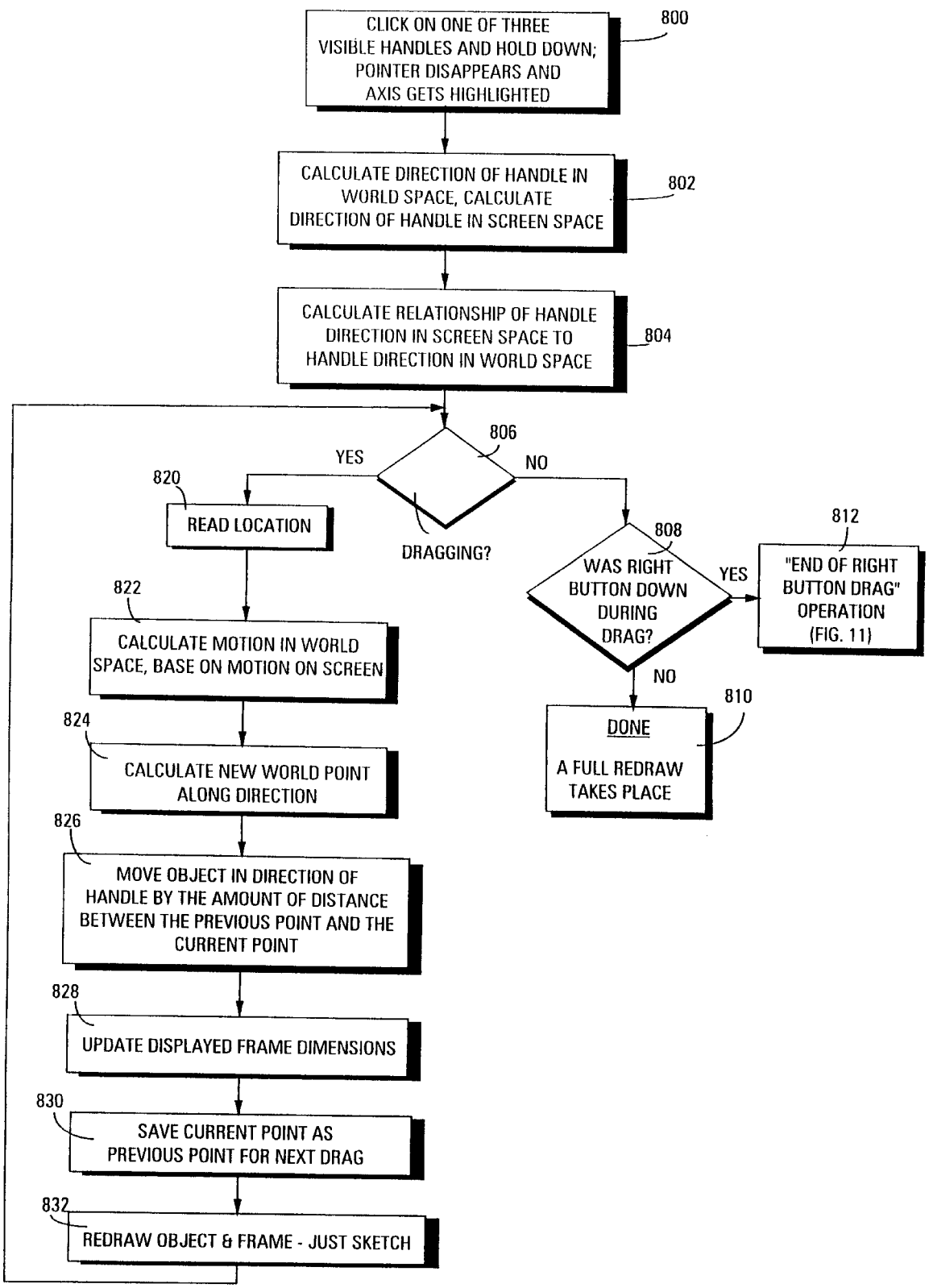
FIG. 8 OBJECT CONSTRAINED TRANSLATION

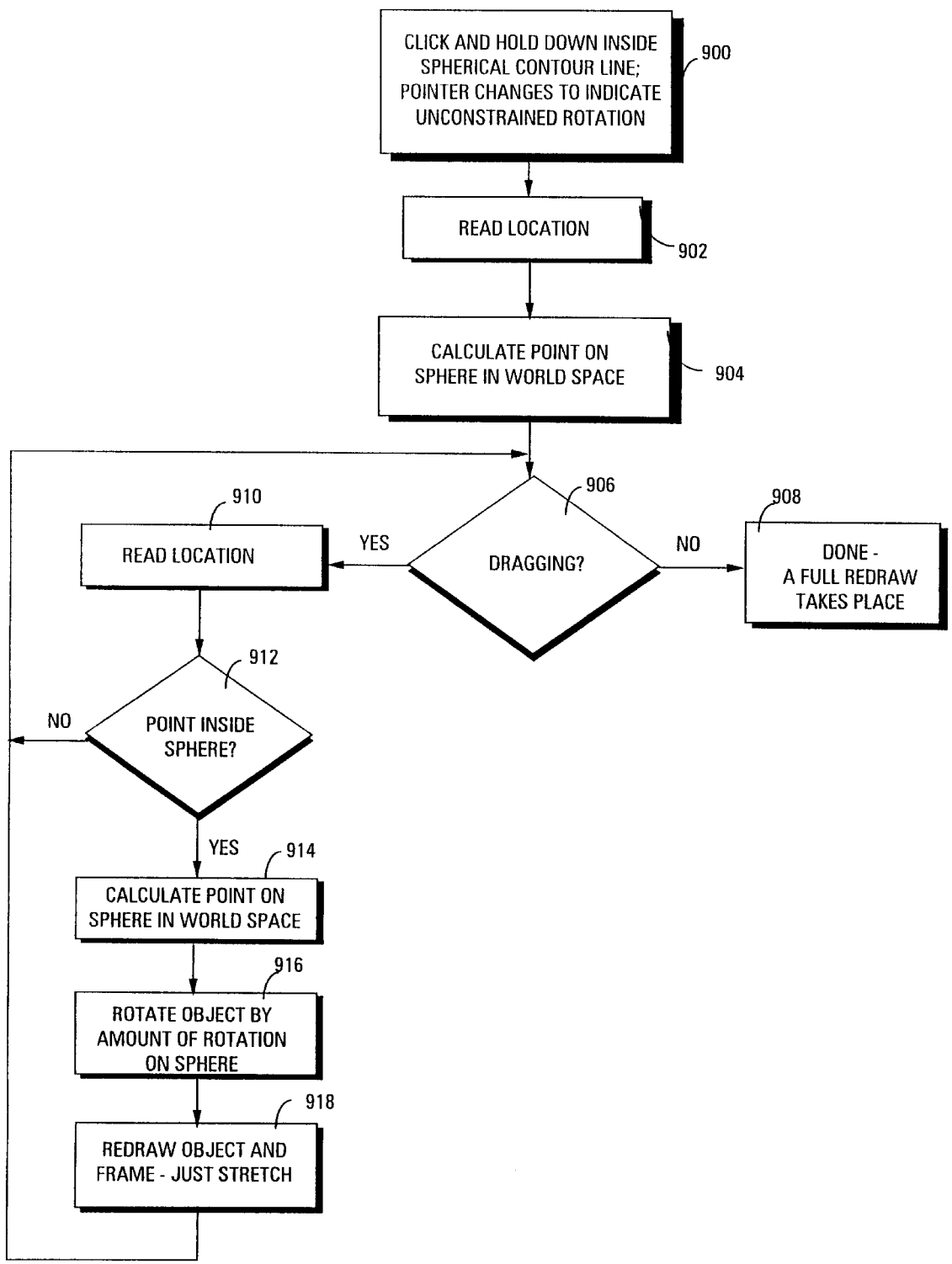

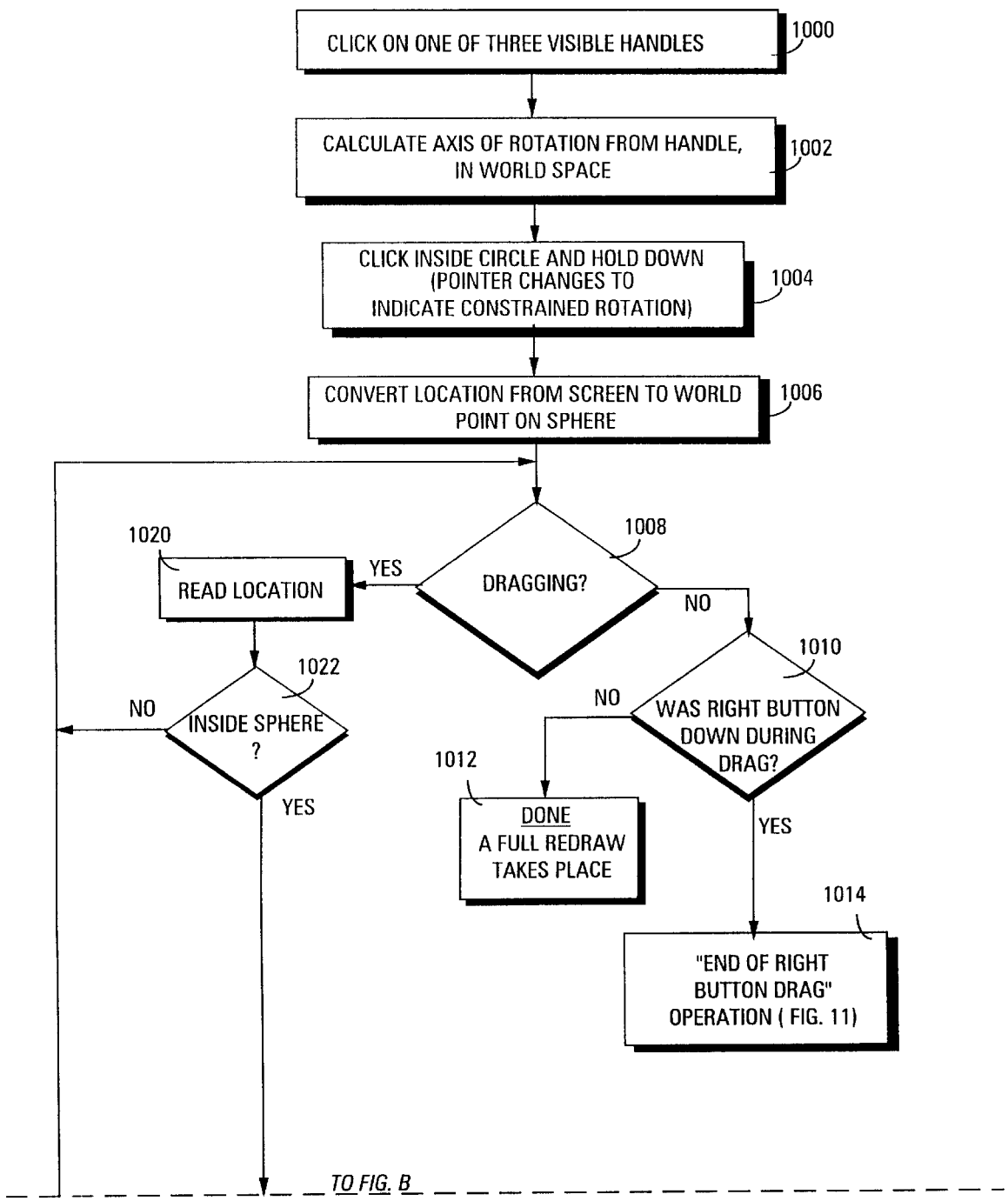
FIG. 10A OBJECT CONSTRAINED ROTATION AROUND HIGHLIGHTED AXIS

OBJECT CONSTRAINED ROTATION

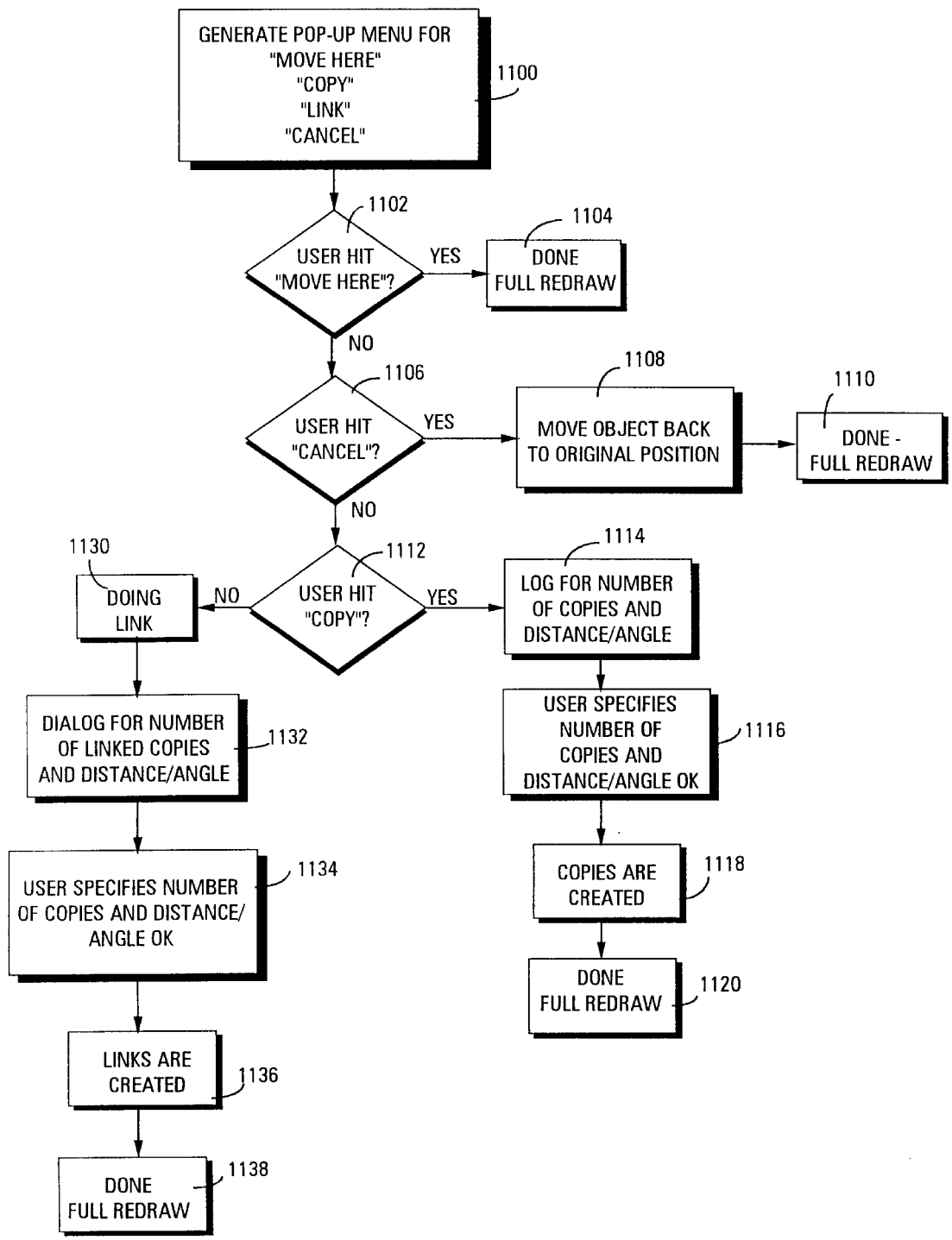
FIG. 11  END OF RIGHT BUTTON DRAG

FIG. 12    EDITTING DIMENSION VALUE
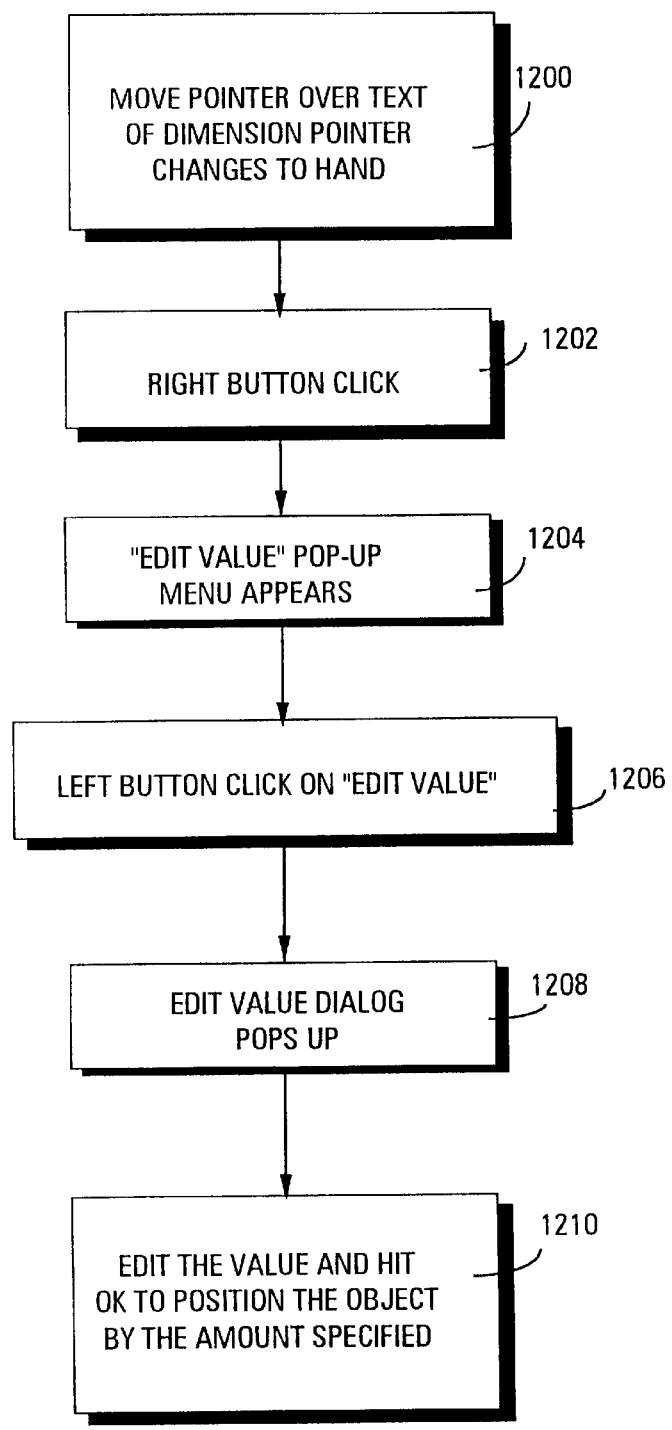

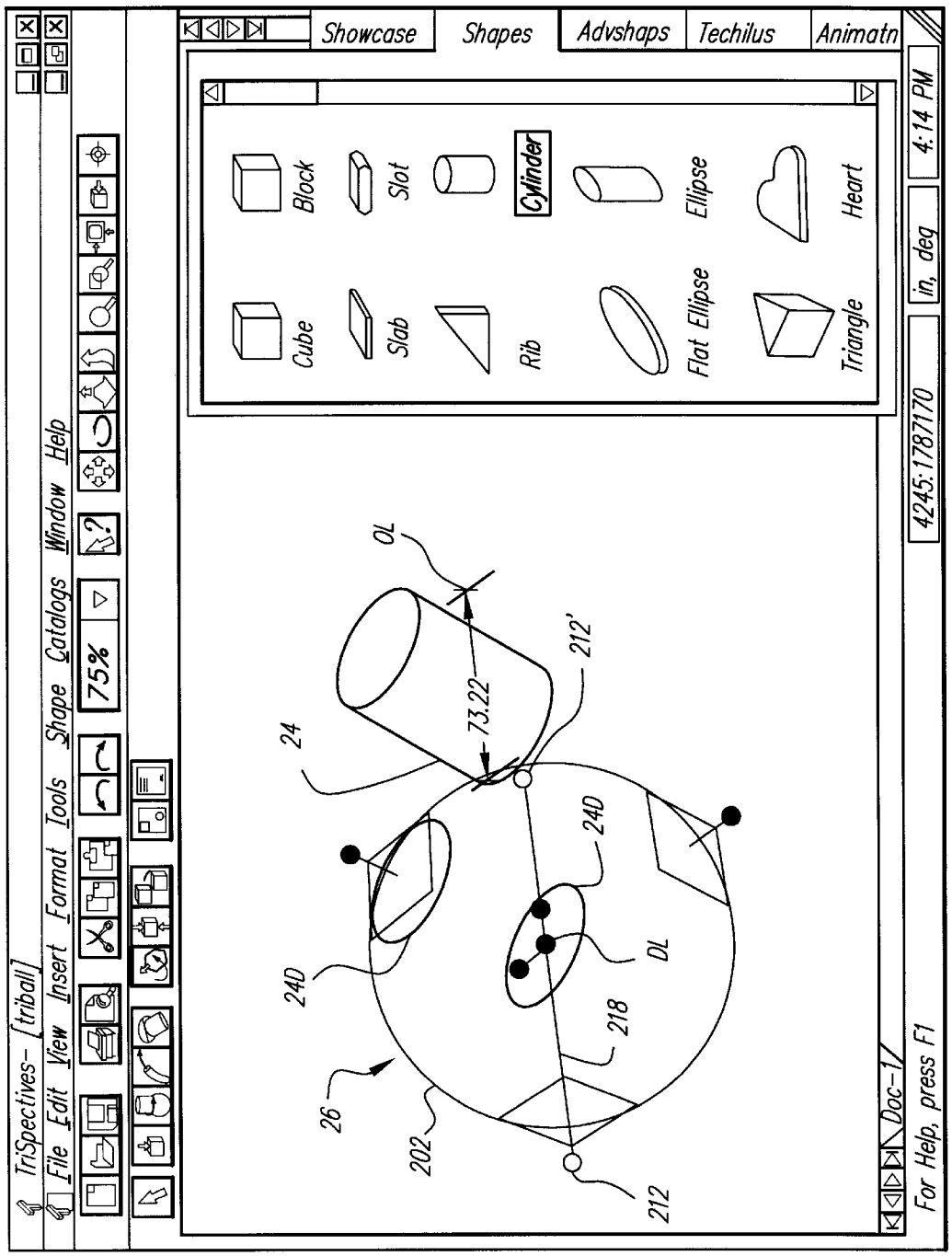

THREE DIMENSIONAL COMPUTER GRAPHICS TOOL FACILITATING MOVEMENT OF DISPLAYED OBJECT

BACKGROUND

1. Field of Invention

This invention pertains to computerized graphics, and particularly to a computerized graphics tool that facilitates depiction of movement of a displayed object.

2. Related Art and Other Considerations

Early computers dealt primarily with the processing and display of text and numbers, such as word processing and mathematical computation. As computers became more sophisticated, and as the pictorial quality of display screens (such as the computer monitors) improved, the capability of computers increased, and an entire computer graphics industry emerged.

Computer graphics enables simulation, on a display screen, of a displayable object. For example, a computer graphics system enables a person such as a designer to generate an image of a 3-D object, such as a chair, for example. Most computer graphics systems allow the designer then to move the image of the chair on the screen, even permitting the designer to turn the chair around, to turn the chair upside down, or to rotate the chair about any of several possible axes.

The ability to move a displayed object is advantageous in computerized graphics. Such movement enables the viewer to see differing aspects of the displayed object. Being able to see graphically the displayed object from other perspectives is important, for example, when a particular surface or portion of the displayed object must undergo further graphical treatment or embellishment. It is also important in a situation in which the displayed object is to form just one building blocking in an overall collection of displayed objects. The ability to visualize differing surfaces of such an object helps a designer better understand how the object is to be connected or situated relative to other objects, as occurs in CAD CAM designs, for example.

For sake of showing rotation of a displayed object, some computer graphics systems depict the displayed object on a screen with the displayed object being pictured within a circle. Such circle-based systems typically have a user input device, such as a mouse or thumbwheels, which controls the position of a pointer or some other referencing frame on the screen. In at least some modes of operation, movement of the user input device, and consequentially of the pointer or frame, causes a rotation or a change of vantage point of the displayed object.

Two examples of computer graphics systems which depict a displayed object within a circle are shown in U.S. Pat. No. 4,734,690 to Waller and U.S. Pat. No. 5,019,809 to Chen. The Chen system is also described to some degree in Chen et al., "A Study In Interactive 3-D Rotation Using 2-D Control Devices", Computer Graphics, Vol. 22, No. 4, Aug. 1988, pp. 121–129. These example systems purport to provide either a spherical panning or visual spherical encapsulation of the displayed object. Waller provides a viewing window which is positionable relative to an imaginary sphere. An imaginary sphere is described by a circle; the window is in a plane tangent to the sphere depicted by the circle. Chen provides a reference circle within which the displayed object is encapsulated, supposedly for acquiring a "trackball" feel.

Some circle-based graphics schemes have not proven sufficiently user friendly. The system of Chen particularly has been criticized, among other things, for not providing sufficient visual feedback and for having a behavior that is hard to understand. See Shoemake, Ken, "Arcball: A User Interface for Specifying Three-Dimensional Orientation Using a Mouse", Proceedings Graphic Interface 1992; May 11–15, 1992; pp. 151–156. Since Chen's reference circle is strictly two-dimensional, its appearance does not change when the displayed object is rotated. While this has the advantage of allowing the circle to be painted on a table or the like instead of being displayed, it does not give the user the feel of a three-dimensional, rotatable sphere.

Some computer graphics systems attempt to provide a sense of a three-dimensional sphere, rather than a two-dimensional circle. The "arcball" of Shoemake, for example, provides additional highlightable arcs on the circle in order to emulate a three-dimensional sphere. Other systems give the impression of a sphere without depiction of a circle in the plane of the screen.

What is needed, therefore, is a computerized graphics system which enables the user better visually to anticipate and appreciate three-dimensional movement of a displayed object.

SUMMARY

Method and apparatus are provided for rotating a displayed object, the displayed object appearing on a screen of a display device of a three dimensional computer graphics system. When the displayed object appears on the display screen, a user input device (e.g., mouse) prompts the additional display of an object movement reference frame on the display screen. The object movement reference frame is characterized by frame features, such as a spherical contour line and various "handles" which together provide a user-friendly three dimensional spherical depiction, as well as optionally displayable axes. The object movement reference frame is preferably superimposed with respect to the displayed object.

The "handles" of the object movement reference frame include a plurality of object image handles. The object image handles are generally classified as planar handles and knob handles. A "handle set" is comprised of paired or connected object image handles, such as a knob handle connected by a radial connector to a planar handle. In the illustrated embodiment, three object handle sets are provided, each along a corresponding one of three mutually orthogonal axes which intersect at a center of the depicted sphere. Whereas knob handles facilitate movement of the displayed object in a linear direction or a rotation about an axis of the knob handle, the planar handles facilitate two dimensional movement of the displayed object.

The "handles" of the object movement reference frame also include frame handles. The frame handles facilitate, among other things, movement of the sphere relative to the displayed object. The frame handles include a frame center knob handle and two frame auxiliary knob handles. Initially, the frame center knob handle is located at an anchor of the displayed object, but is thereafter movable about the displayed object.

When a pointer (e.g., mouse cursor) on the display screen approaches a neighborhood of a handle, as can occur when the mouse is manipulated, the pointer changes from its pointer nominal representation (e.g., an arrow) to a pointer movement representation. Depending on which handle the pointer approaches, the pointer movement representation may result in the pointer appearing as a grasping human hand or a set of arrows pointing in four opposite and mutually perpendicular positions. If, for example, the pointer is near a knob handle point, the pointer representation becomes the grasping human hand. If the pointer is within a planar square portion of a planar handle, the pointer becomes the four arrows.

When the pointer is in one of its pointer movement representation (e.g., the grasping hand or four arrows) as a result of pointer approach to a handle, the mouse left button can be activated to enter an object movement or object displacement mode. The displayed object is displaceable or moveable during the object movement mode. The direction of the particular movement (e.g., linear displacement, planar displacement, rotation) depends upon which particular handle the pointer is proximate when the mouse left button is activated. As explained above, the direction of movement is visually anticipated and indicated by the pointer movement representation.

The extent of movement (e.g., displacement) of the displayed object during the object movement mode is related to the extent of mouse movement. Advantageously, during the object movement mode a vector is displayed showing the actual displacement of the displayed object from an original location to a displaced location. Additionally, a numerical indication of the extent of the displacement is provided on the display screen. As the displayed object is moved, the object movement reference frame is simultaneously moved in coordination with the displayed object.

When the pointer is in a neighborhood of the object image handle region, the mouse left button can be actuated to prompt display of an axis of movement on the display device. The axis of movement extends from the handle region (preferably the handle point) to a predetermined position on the display device relative to the movement reference frame. The axis of movement preferably extends through a center of the depicted sphere to an opposite point on the sphere. When the pointer is moved along the axis of movement, the pointer changes its representation to a rotational representation (e.g, an arrow depicting rotation), indicating that rotation of the image of the object about the axis of movement is possible upon further activation of the mouse left button.

As mentioned above, when the pointer is in a neighborhood of one of the object image handle regions, the object movement mode can be entered by actuating the mouse left button. The displayed object can be displaced or moved from an original location to a displaced location in accordance with movement of the mouse. When the displayed object reaches the displaced location, the mouse right button can be actuated to prompt display of a menu. As a first response to the menu as effected by the mouse right button, a copy of the displayed object can be generated at the displaced location (the displayed object remaining at the original location). As a second response to the menu, not only will a copy of the displayed object be generated at the displaced location, but the copy of the displayed object will be linked to the displayed object which remains at the original location. As a result of the linking, whatever action is taken with respect to either the copy or the original is also taken with respect to the other.

During the object movement mode, as the pointer is dragged through a movement, the displayed object is sketched or partial redrawn in its displaced location while the displayed object remains shown at its original location. In a sketch, only selected features of the displayed object (e.g., a perimeter of a surface of the displayed object) are reproduced in a displaced location. The partial drawing of the displaced displayed object in its displaced location, along with the depiction of the entire displayed object in its original location, affords the user a better feel for the movement which is undergone by the displayed object in accordance with movement of the pointer.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4 is a flowchart showing steps executed in connection with a drag frame center knob handle movement mode of the present invention.

FIG. 5 is a flowchart showing steps executed in connection with a drag frame orientation knob handle movement mode of the present invention.

FIG. 7 is a flowchart showing steps executed in an object constrained rotation (about screen Z axis) movement mode of the present invention.

FIG. 8 is a flowchart showing steps executed in an object constrained translation movement mode of the present invention.

FIG. 9 is a flowchart showing steps executed in an object unconstrained rotation movement mode of the present invention.

FIG. 10A and FIG. 10B are flowcharts showing steps executed in an object constrained rotation (about highlighted axis) movement mode of the present invention.

FIG. 11 is a flowchart showing steps executed in an "end of right button drag" operation.

FIG. 12 is a flowchart showing steps executed in an "editing dimension value" operation.

FIG. 13-1 through FIG. 13-19 are schematic representations of differing screen display appearances displayable on a display device including in the graphics system of the present invention.

DETAILED DESCRIPTION OF THE DRAWINGS

Figure 1:
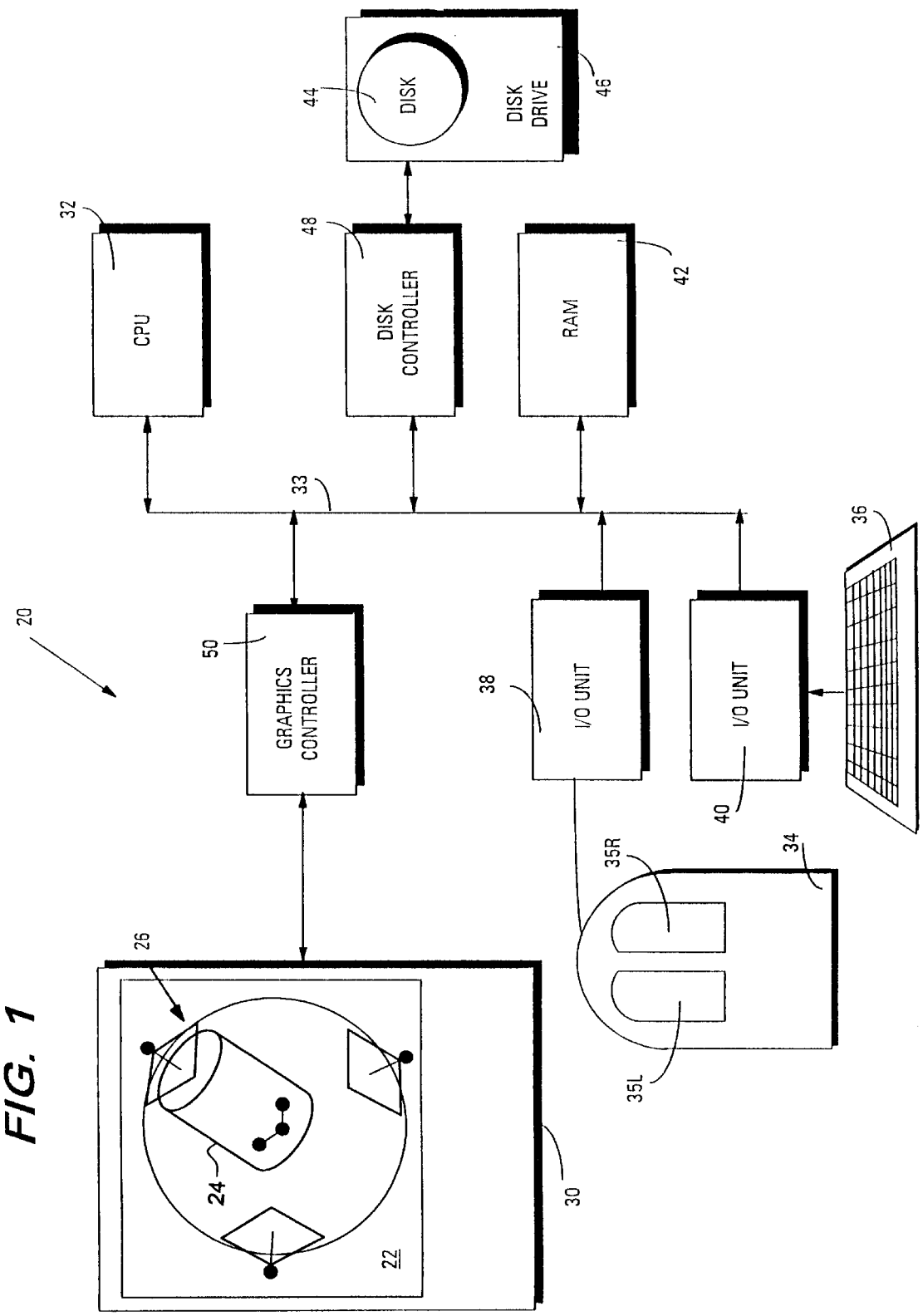
FIG. 1 is a schematic view of a computer graphics system according to an embodiment of the invention.

FIG. 1 shows a computer graphics system (CGS) 20 according to an embodiment of the invention. At the moment in time depicted in FIG. 1, a portion of a display screen 22 of CGS 20 shows a cylindrical drum 24, as well as a specialized graphics tool which gives the impression of a sphere about drum 24. Drum 24 is just one example of a "displayed object" which could be displayed on screen 22. It should be realized that other types of objects can be displayed on screen 22, either alone or in combination with other objects to yield a scene or the like.

As will be described in more detail hereinafter, the graphics tool which provides the sphere image results from computerized execution of a specialized graphics "tool object". A "displayed object" is an image that appears on screen 22 based on certain data stored elsewhere in CGS 20. A computer code "object" such as a "tool object", on the other hand, is a specialized set of computer information that (in some computer languages such as C++) includes not only specialized data, but instructions as to how the data is to be utilized or operated upon.

The "tool object" of particular importance herein facilitates generation, movement, modification, and utilization of an object movement reference frame 26. Object movement reference frame 26 is depicted in FIG. 1 and elsewhere herein as the sphere and its various handles (described in more detail hereinafter). Since the particular tool object of interest to this invention serves to displace (e.g., move or rotate) the displayed object on the screen, it is more formally referred to herein as a displayed object movement tool.

One commercial version of the displayed object movement tool is known as "TriBall™". It should be understood, however, that the present invention is not limited to a product so named. With this in mind, at some junctures the object movement reference frame generated by the tool will simply be referred to herein, merely for convenience, as the "TriBall".

Screen 22, upon which the object movement reference frame 26 appears, is ultimately generated by a display device such as computer graphics monitor 30. Monitor 30 forms one part of the hardware of CGS 20, with other elements also being shown in FIG. 1. Such elements include a central processing unit (CPU) 32 which communicates with various other constituent members of CGS 20 over a master bus 33. A user communicates with CGS 20 through the instrumentality of a mouse 34 and, when desired, a keyboard 36. In some embodiments, mouse 34 and keyboard 36 are interfaced to bus 33 by respective input/output units 38, 40. In the embodiment herein described, mouse 34 has a left mouse button 35L and a right mouse button 35R.

CGS 20 also has various forms of electronic memory available, such as on-board random access memory (RAM) 42 and a disk 44. Disk 44 is housed in disk drive 46, disk drive 46 interfacing with bus 33 via a disk controller 48. Although only one disk 44 and one drive 46 are shown in FIG. 1, it should be understood that a plurality of disks can be utilized, either magnetic disk (hard or floppy) and/or optical.

The display provided on monitor 30 is driven by a graphics controller 50. Graphics controller 50 communicates with CPU 32 over bus 33. In some embodiments, graphics controller 50 can take numerous forms including that of a graphics card insertable on a backplane, for example, of a personal computer or the form of an integrated circuit.

Figure 2:
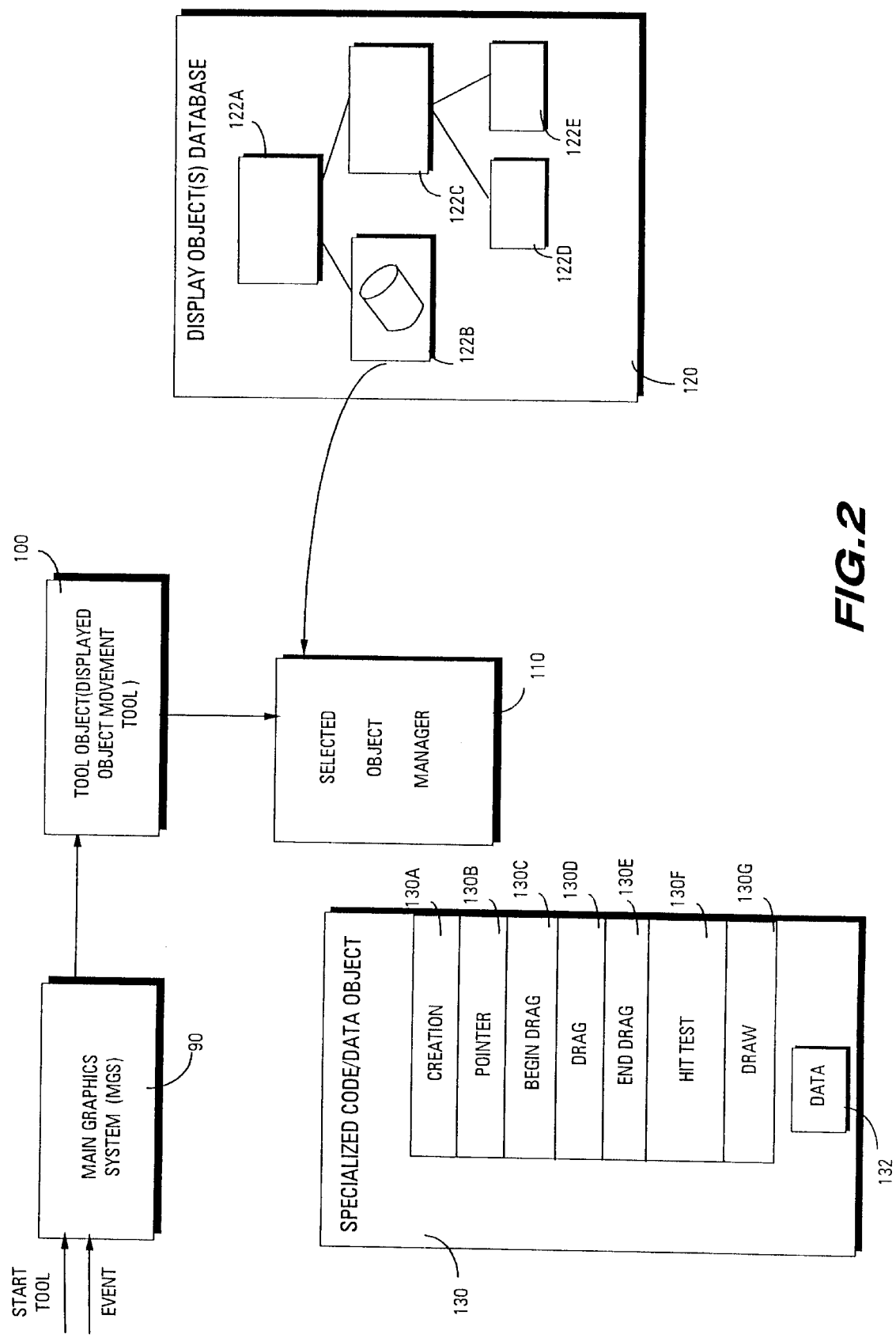
FIG. 2 is a schematic view showing an interrelationship between various systems, objects, and a database for the computer graphics system of FIG. 1.
Figures 1, 13:
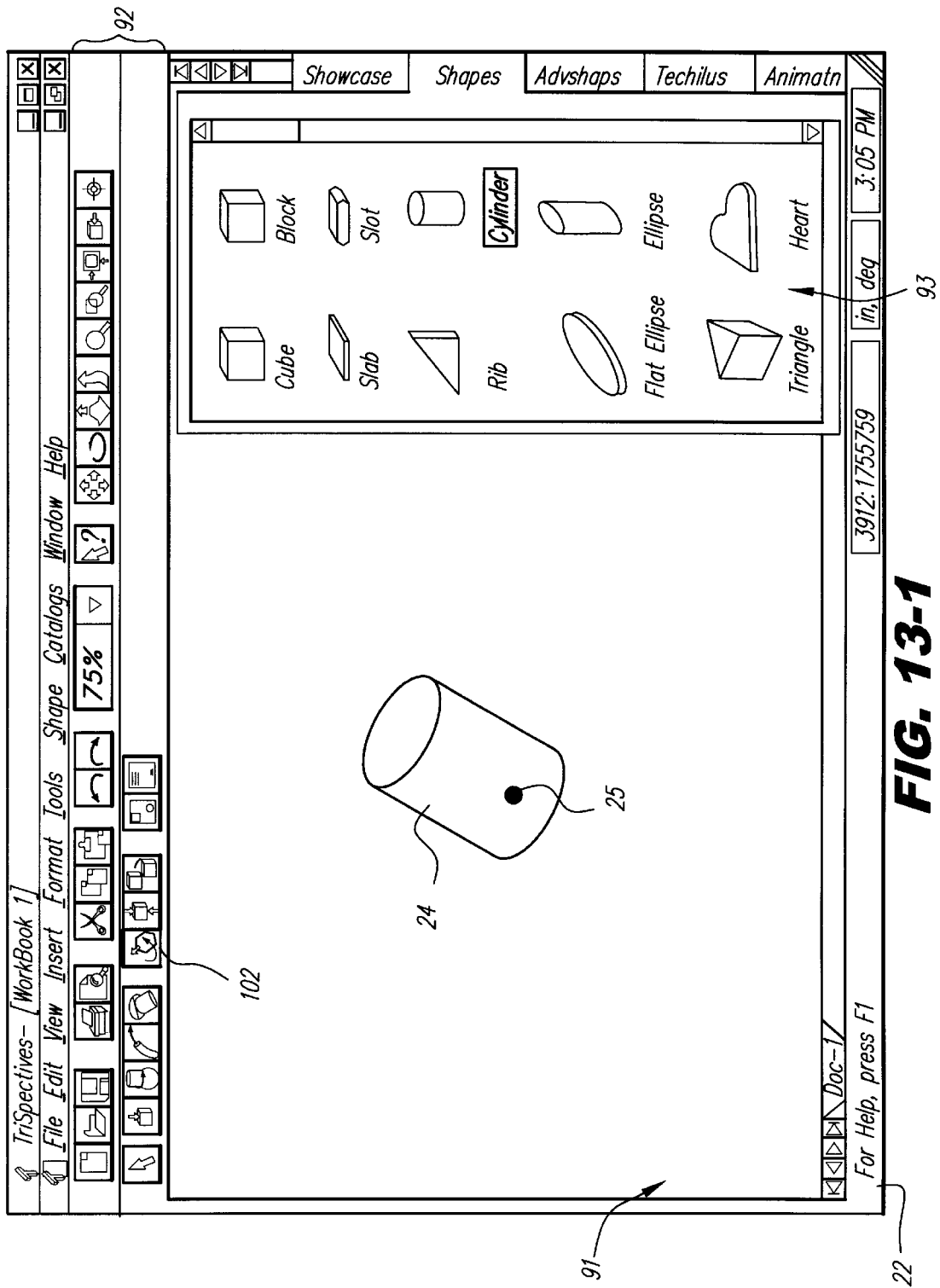
Figures 2, 13:
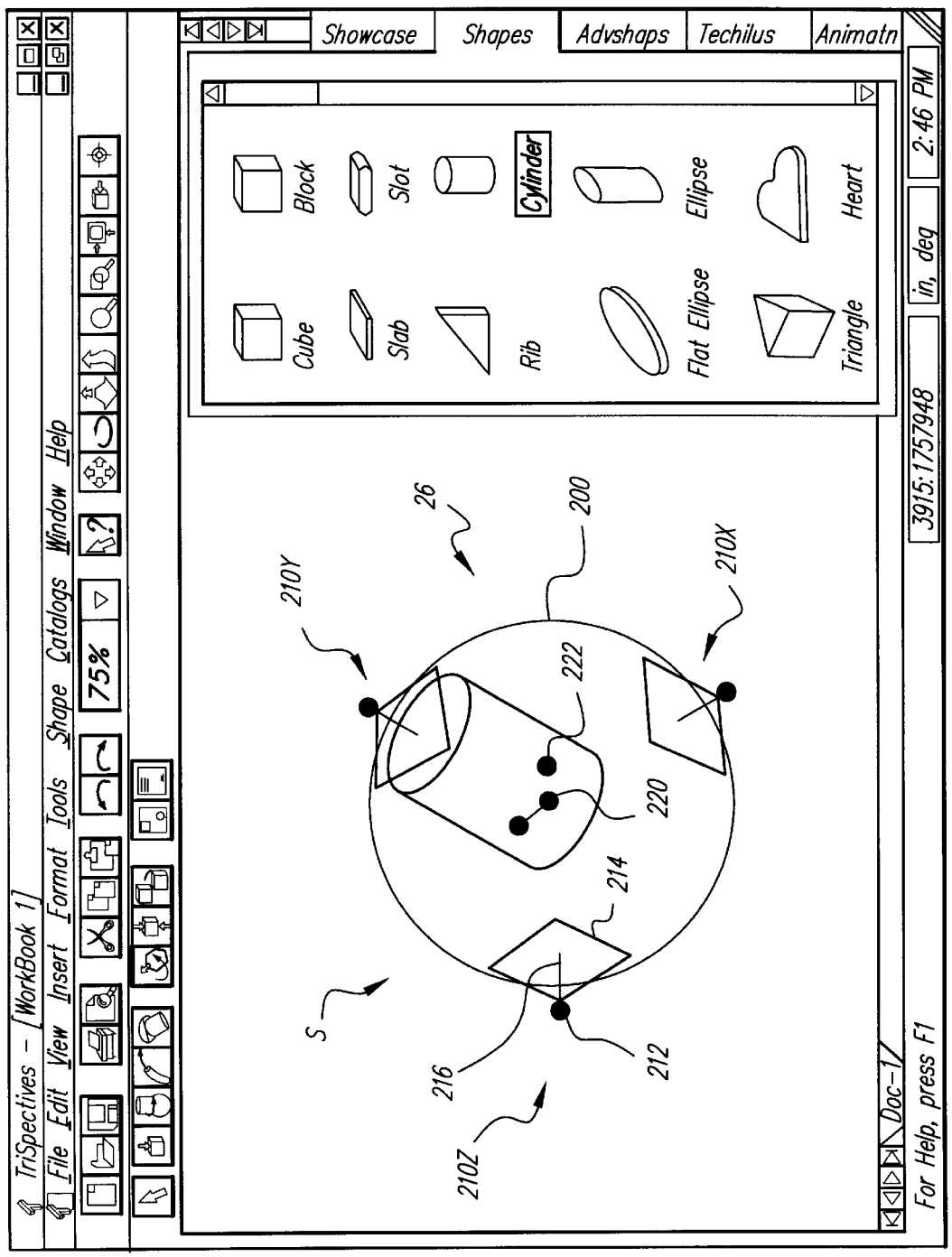

In the course of operation, CPU 32 executes instructions, i.e., computer programs or computer code. FIG. 2 shows graphically depicts a main graphics system (MGS) 90 which is executed by CPU 32. FIG. 13-1 depicts (more fully than FIG. 1) the appearance of monitor screen 22 resulting at a certain stage of execution of MGS 90. As shown in FIG. 13-1, monitor screen 22 includes a general viewing field 91; a tool bar 92; and a display object selection field 93 (as well as other fields not pertinent to the present invention).

In the illustrated embodiment, main graphics system 90 is an object oriented program which actually includes several "tools", each tool having a "tool object" and (typically) a corresponding tool button on tool bar 92. As mentioned above, one such tool is of particular interest herein: object movement tool 100 (see FIG. 2). As explained in more detail below, object movement tool 100, initiated by activation of tool button bar 102, ultimately manages object movement reference frame 26.

A Main Graphics System (MGS) providing a context particularly suitable for operation of the object movement reference frame 26 of the present invention is described in U.S. patent application Ser. No. 08/635,293 entitled "INTELLIGENT SHAPES FOR AUTHORING THREE-DIMENSIONAL MODELS", filed simultaneously herewith and incorporated herein by reference, as well as documentation describing the "TriSpectives™" graphics software marketed by 3D/Eye Inc. It should be understood, however, that the principles of the current invention are not limited to employment with such system, but extend to any system facilitating the present invention.

CPU 23 also executes a set of instructions known as the Selected Object Manager 110. Selected Object Manner 110 has access to a Display Objects Database 120. Displayed Objects Database 120 has pre-stored therein sets of data necessary for generating various displayable objects or shapes, such as display objects 122A, 122B, . . . 122E, for example. Since an association or interrelationship can exist between display objects 122, such display objects are shown in tree form in database 120. Display Object Database 120 can be stored in any suitable form of memory in CGS 20. One particular display object of interest herein and shown in FIG. 2 is display object 122B, which corresponds to the cylindrical drum 24 shown on monitor 30 of FIG. 1.

When (e.g., via mouse 34) a user selects a particular display object (such as the cylindrical drum) from display object selection field 93 (see FIG. 13-1), Selected Object Manager 110 (part of MGS 90) retrieves, from database 120, the data set associated with the selected displayed object. In the present illustration, data for display object 122B is retrieved, and Selected Object Manager 110 (part of MGS 90) uses the data for the selected display object in a way that causes display of the selected display object on monitor 30. FIG. 13-1 shows the display of selected display object 122B in the form of cylindrical drum 24. In addition to the display of drum 24 per se, an object "anchor" 25 is also displayed.

Selected Object Manager 110 also plays a role in generation and operation of the display movement frame 26. That is, when tool button 102 is activated (e.g., by a click on left mouse button 35L), MPG 90 receives a start tool command specifically for starting the displayed object movement tool 100. Upon activation of tool button 102, the displayed object movement tool 100 (which is a tool object) creates an instance of itself e.g., by setting pointers to appropriate code and allocating space in memory (e.g., for the data that it will utilize). Upon creation of the instance of displayed object movement tool 100, the created instance of displayed object movement tool 100 signals Selected Object Manager 110, so that Selected Object Manager 110 creates a specialized code/data object 130. Specialized code/data object 130 has numerous functions, briefly schematically depicted in FIG. 2 and assigned reference numeral 130 with alphabetical suffixes, including function 130A of generating the display on monitor screen 22 of the object movement reference frame 26 (e.g., the sphere and its handles). Specialized code/data object 130 also has a data area 132 in which data upon which it operates is stored.

Assuming that tool button 102 was activated while drum 24 is displayed on monitor screen 22 in the manner shown in FIG. 13-1, object movement reference frame 26 appears in the manner shown in FIG. 13-2. As mentioned above, object movement reference frame 26 includes frame features, including a spherical contour line 200 and various "handles".

The "handles" of the object movement reference frame 26 include a plurality of object image handles. The object image handles are generally classified as planar handles and knob handles. A "handle set" is comprised of paired or connected object image handles, such as a knob handle connected by a radial connector to a planar handle. When requested, a "handle set" can be expanded to include an axis of the depicted sphere.

In the illustrated embodiment, as shown in FIG. 13-2, three handle sets 210X, 210Y, and 210Z are provided, each along a corresponding one of three mutually orthogonal axes which intersect at a center of the sphere S. Each handle set 210 includes a knob handle 212 and a planar handle 214. In each set, knob handle 212 is connected by a radial connector 216 to planar handle 214. Each planar handle 214 comprises a representation of a planar square situated at a tangent to sphere S.

Although only one of the handle sets of FIG. 13-2 is so numbered (i.e., handle set 210Z), it should be understood that similarly numbered (but bearing differing axial suffixes) knob handles 212, planar handles 214, and radial connectors 216 comprise the remaining handle sets 210Y and 210Z.

As necessary, each handle set 210 can be expanded to include a displayed axis emanating from the center of sphere S to the handle set 210. When such an axis forms part of a handle set 210, the axis is referred to as an axis handle.

The "handles" of object movement reference frame 26 also include frame handles. The frame handles facilitate, among other things, movement of sphere S relative to the displayed object. The frame handles include a frame center knob handle 220 and two frame orientation knob handles 222. Frame center knob handle 220 and frame orientation knob handles 222 lie in a frame handle plane. Initially, the frame center knob handle 220 is located at anchor 25 of the displayed object, but is movable about the displayed object in the manner hereinafter described.

Object movement reference frame 26 with its spherical contour line 200 and handles (described above) provide, as shown in FIG. 13-2, a user-friendly and genuine depiction of the displayed object within a sphere S. Such spherical depiction provides the user with a genuine sense of movement of the displayed object, as the sphere S itself appears to rotate. In addition to providing such advantageous three dimensional depiction, the object movement reference frame 26 of the present invention has numerous other usages and advantages, as described below.

The usages and advantages of object movement reference frame 26 are particularly understood in context of a discussion of the operation of specialized code/data object 130 (see FIG. 2) executed by CPU 32. For purposes of illustration and discussion herein, the operation of specialized code/data object 130 is shown e.g., by FIG. 3A, FIG. 3B, FIG. 4–FIG. 12 which are flowcharts showing steps involved in such operation.

Figure 3A:
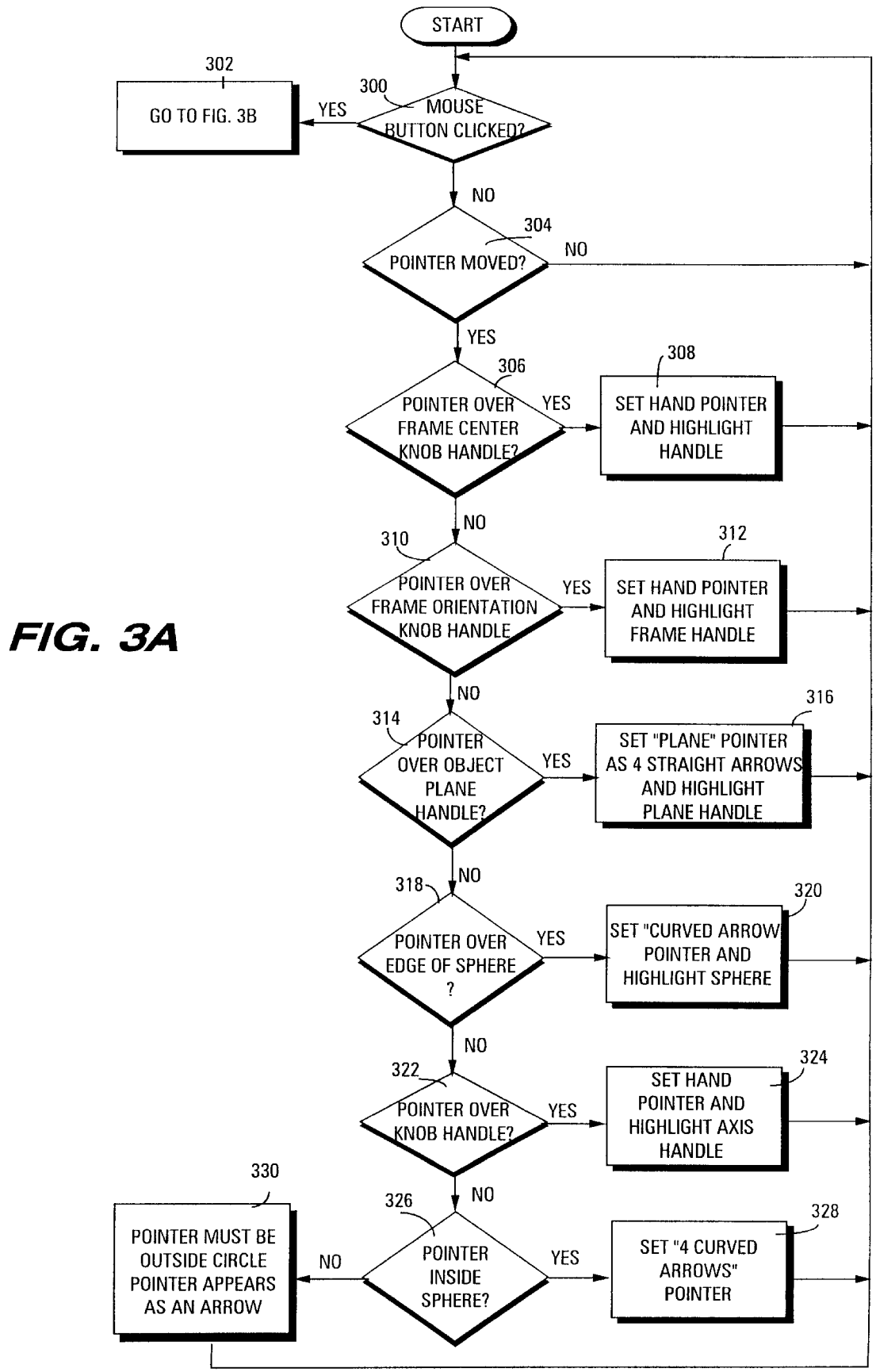
FIG. 3A and FIG. 3B together form a flowchart showing general steps executed in connection with operation of a displayed object movement tool of the present invention.

As shown in FIG. 3A, at step 300, a determination is made whether either the mouse left button 35L or mouse left button 35R is "clicked". The "clicking" of a button of mouse 34 is shown in FIG. 2 as an "event" communicated to main graphics system 90 by an operating system executed by CPU 32. If either button of mouse 34 was clicked, execution jumps to the steps shown in FIG. 3B (as depicted by flowchart symbol 302) so that a selected one of a plurality of movement modes can be entered.

FIG. 3A primarily includes steps for determining whether the current position of the pointer is over one of the features of object movement reference frame 26, such as one of the handles of frame 26. For the pointer to be "over" a frame feature, the current screen coordinates of the pointer need only be in a neighborhood of the current screen coordinates of the frame feature. What constitutes a "neighborhood", e,g., the number of screen pixels between the pointer coordinates and the feature coordinates, is predetermined in accordance with display parameters of the CGS 20.

Figure 3B:
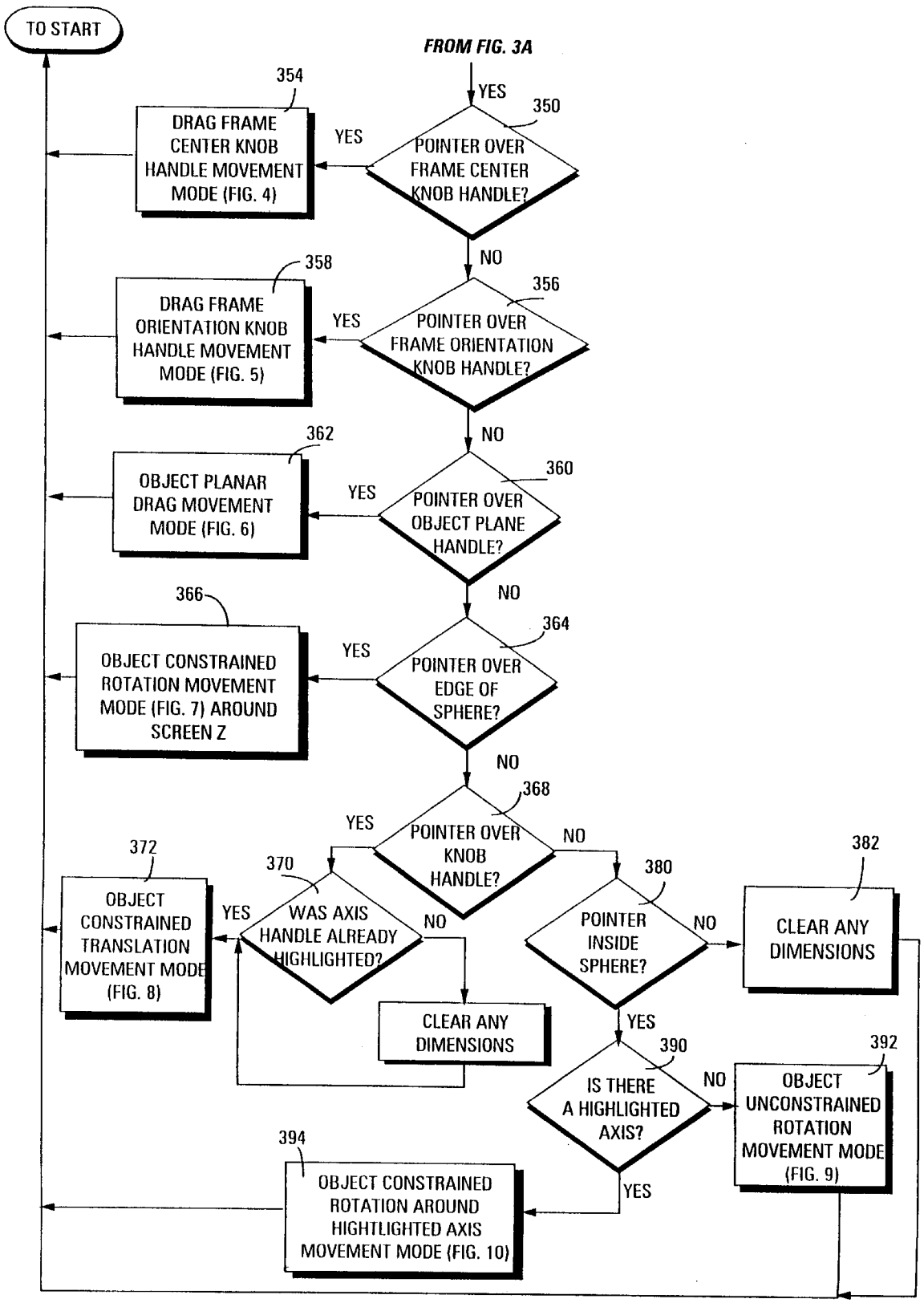

As will be seen below in connection with FIG. 3A, whenever the current position of the pointer is over a selected frame feature, both the frame feature itself and the pointer can change appearance on display screen 22. Thereafter, if mouse left button 35L is clicked while the feature and pointer appearances are so changed, execution enters one of its object movement modes (as generally depicted in FIG. 3B). FIG. 4–FIG. 10A and FIG. 10B depicted steps executed in various object movement modes. Although not expressly shown in FIG. 3B, it should be understood that, prior to entering an object movement mode, any dimensions displayed on screen 22 are cleared.

Figures 3, 13:
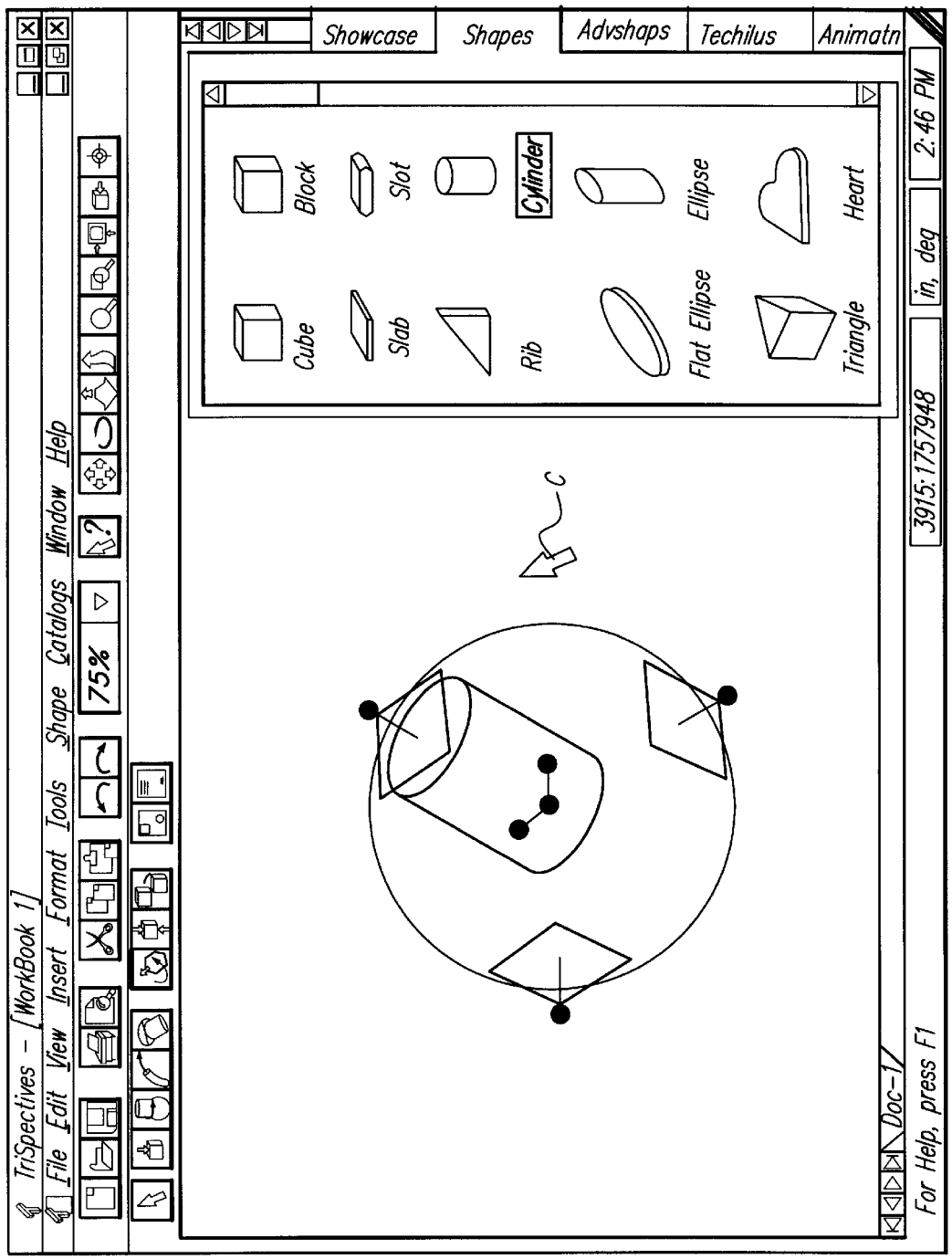

Turning now to specific steps involved in FIG. 3A, at step 304 it is determined whether the mouse pointer has moved. FIG. 13-3 shows mouse pointer C in its nominal representation, i.e., having an arrow shape. Although referenced textually herein as a "pointer", the pointer can also be called a "cursor". In connection with step 304, the operating system periodically, e.g., several times per second, checks (as an "event" to MGS 90) the position of mouse pointer C on monitor screen 22. If the mouse pointer C has not moved on screen 22 since the last check, execution loops back to step 300.

Figures 4, 13:
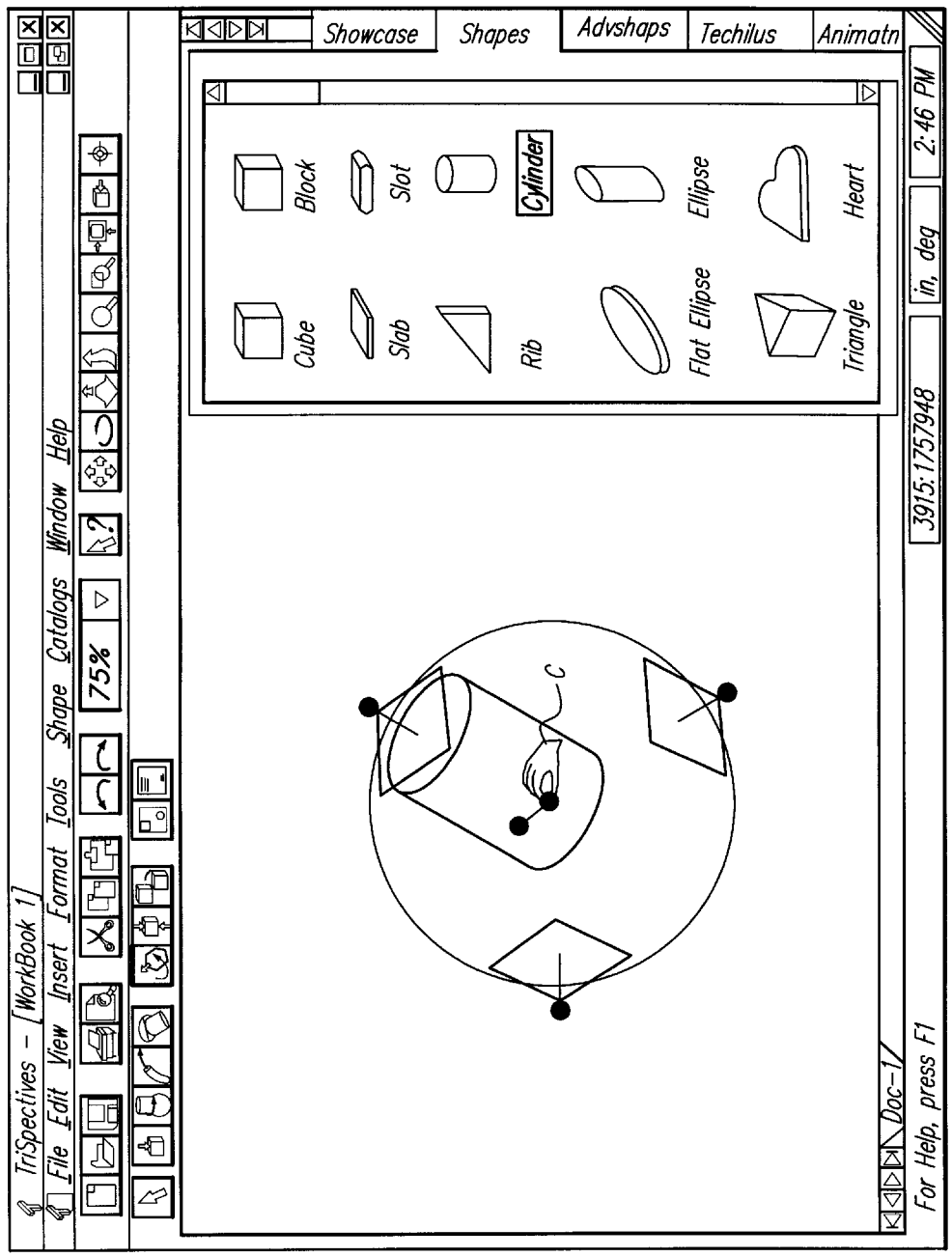

If mouse pointer C has moved and is over the frame center knob handle 220 (as determined at step 306 of FIG. 3), step 308 is executed. At step 308, the interior of the frame center knob handle changes color (e.g., is highlighted) and mouse pointer C changes to have a movement representation. The particular movement representation acquired by mouse pointer C at step 308 is that of a grasping human hand (see FIG. 13-4). Thereafter, if the mouse left button 35L is clicked, a drag frame center knob handle movement mode is entered. In this regard, since it will be determined (via step 302) at step 350 of FIG. 3B that the mouse pointer is over a frame center knob handle 220, the drag frame center knob handle movement mode is entered as shown by step 354. Steps involved in the drag frame center knob handle movement mode are shown in FIG. 4 and discussed hereinafter.

Figures 5, 13:
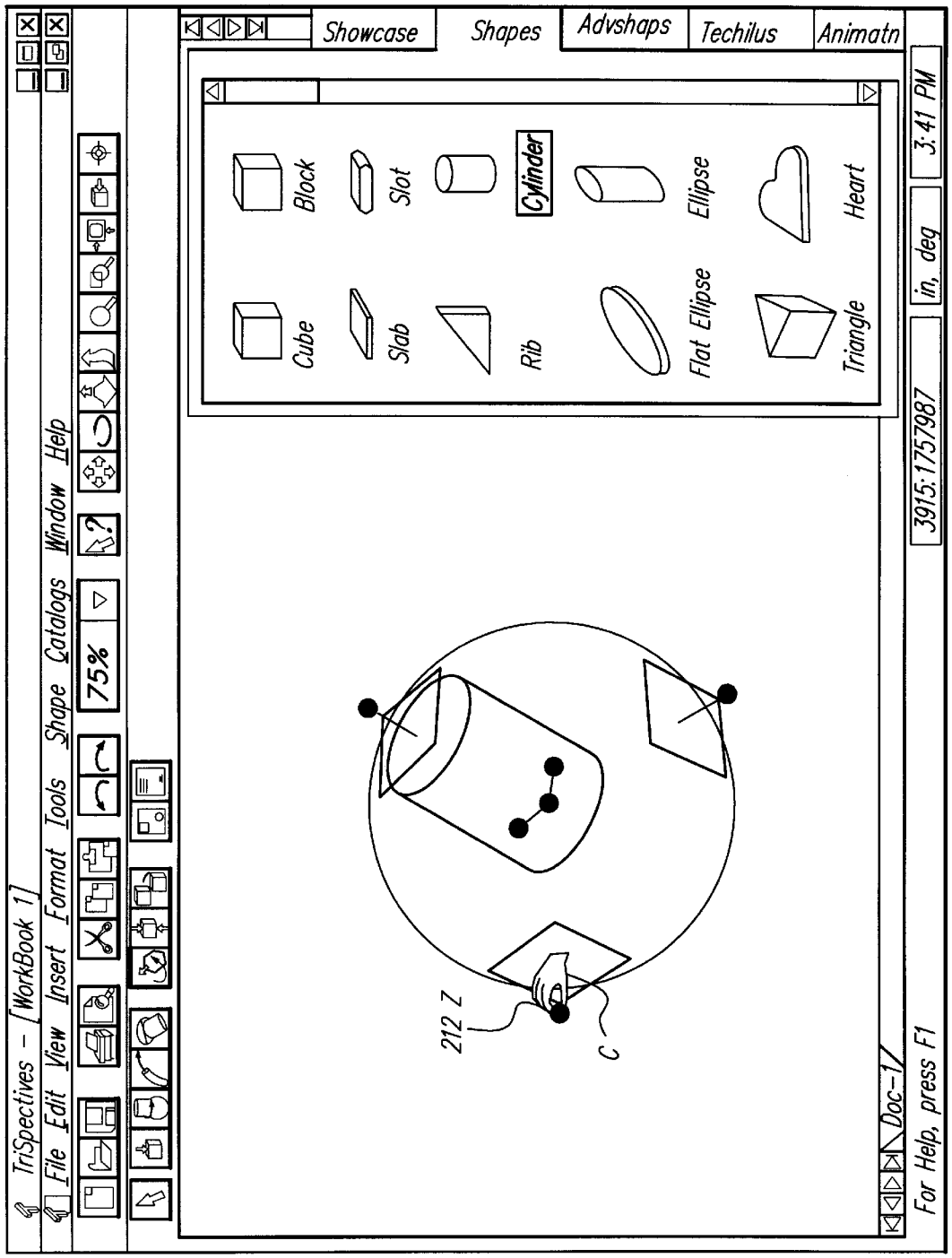
Figures 6, 13:
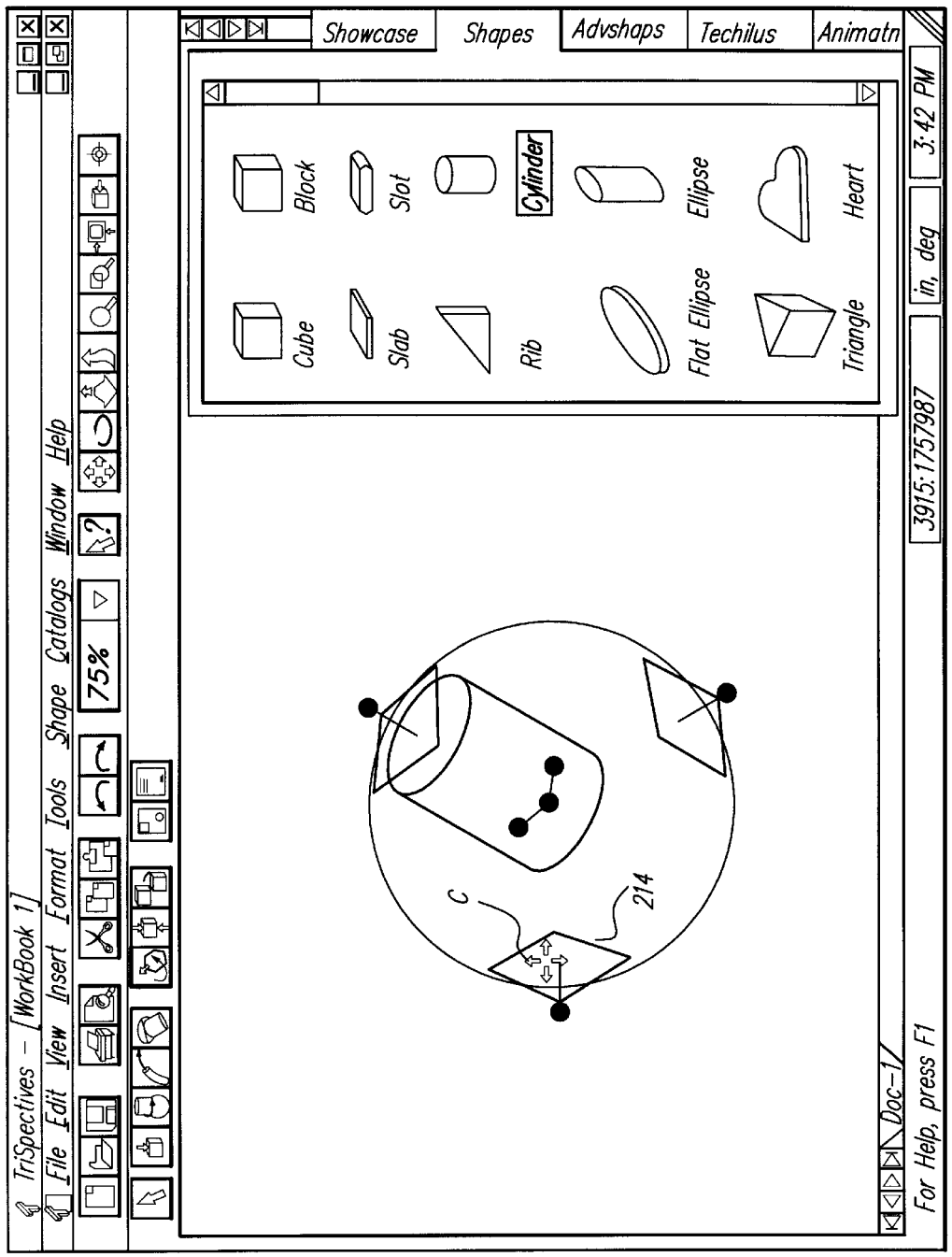

If mouse pointer C has moved and is over one of the frame orientation knob handles 222 (as determined at step 310 of FIG. 3), step 312 is executed. At step 312, the interior of the selected frame orientation knob handle 222 changes color and mouse pointer C changes to have the grasping hand movement representation. Thereafter, if the mouse left button 35L is clicked, a drag frame orientation knob handle movement mode is entered. In this regard, since it will be determined at step 356 of FIG. 3B that the mouse pointer C is over a frame orientation knob handle 222, the drag frame orientation knob handle movement mode is entered as shown by step 358. Steps involved in the drag frame orientation knob handle movement mode are shown in FIG. 5 and discussed hereinafter.

Figure 6:
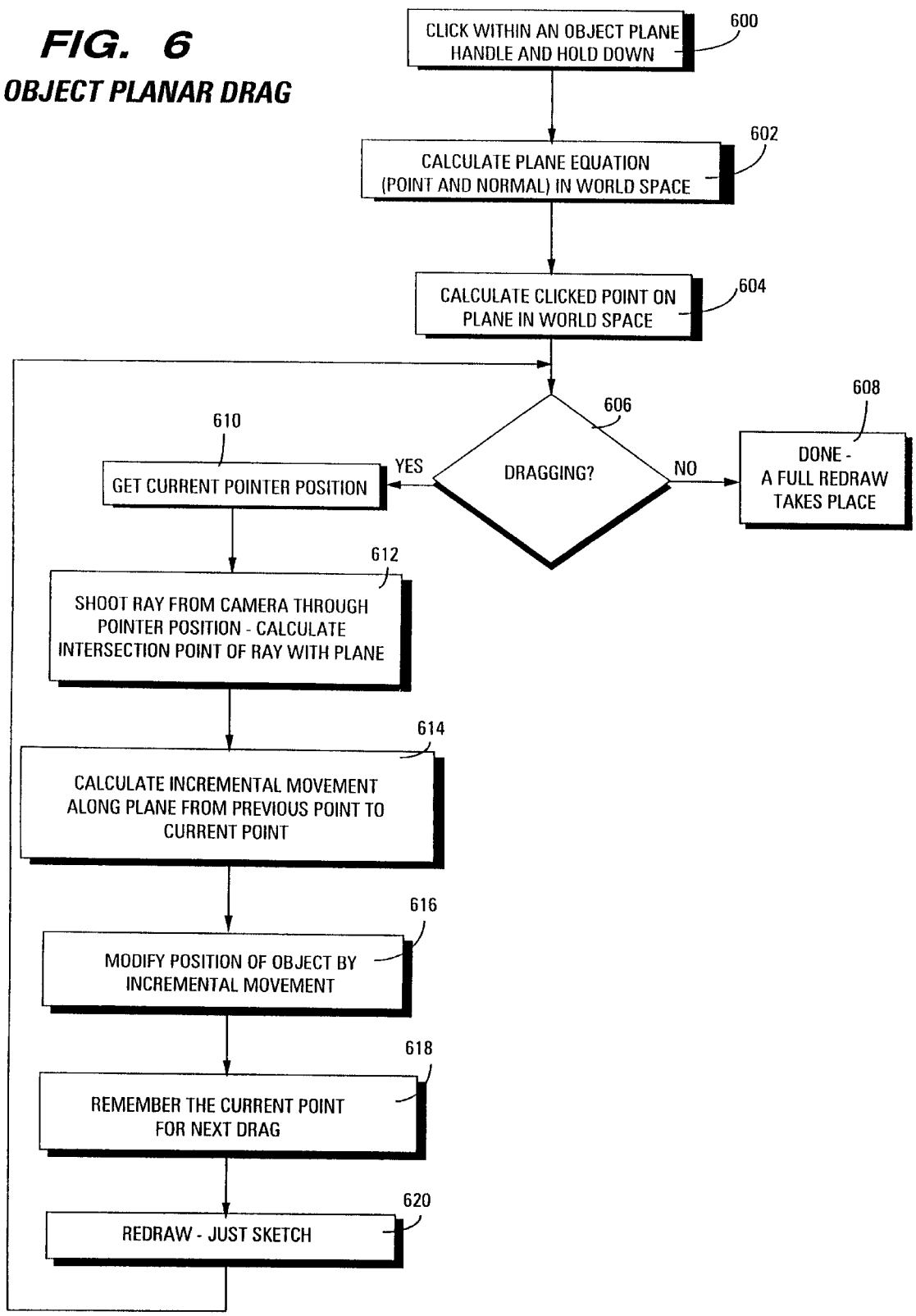
FIG. 6 is a flowchart showing steps executed in connection with an object planar drag movement mode of the present invention.

If it is determined at step 314 (see FIG. 3A) that mouse pointer C is over one of the object plane handles 214, step 316 is executed. At step 316, mouse pointer C changes to another one of its movement representations, in particular the four orthogonal outwardly pointing arrows shown in FIG. 13-16. As mouse pointer C is moved within the interior of the square region bounded by plane handle 214, mouse pointer C retains this "planar" movement representation. In addition, the square perimeter of plane handle 214 is highlighted (i.e., changes to a contrasting color). Thereafter, if the mouse left button 35L is clicked, an object planar drag movement mode is entered. In this regard, since it will be determined (via step 302) at step 360 of FIG. 3B that the mouse pointer C is over an object plane handle 214, the object planar drag movement mode is entered as shown by step 362. Steps involved in the object planar drag movement mode are shown in FIG. 6.

Figures 7, 13:
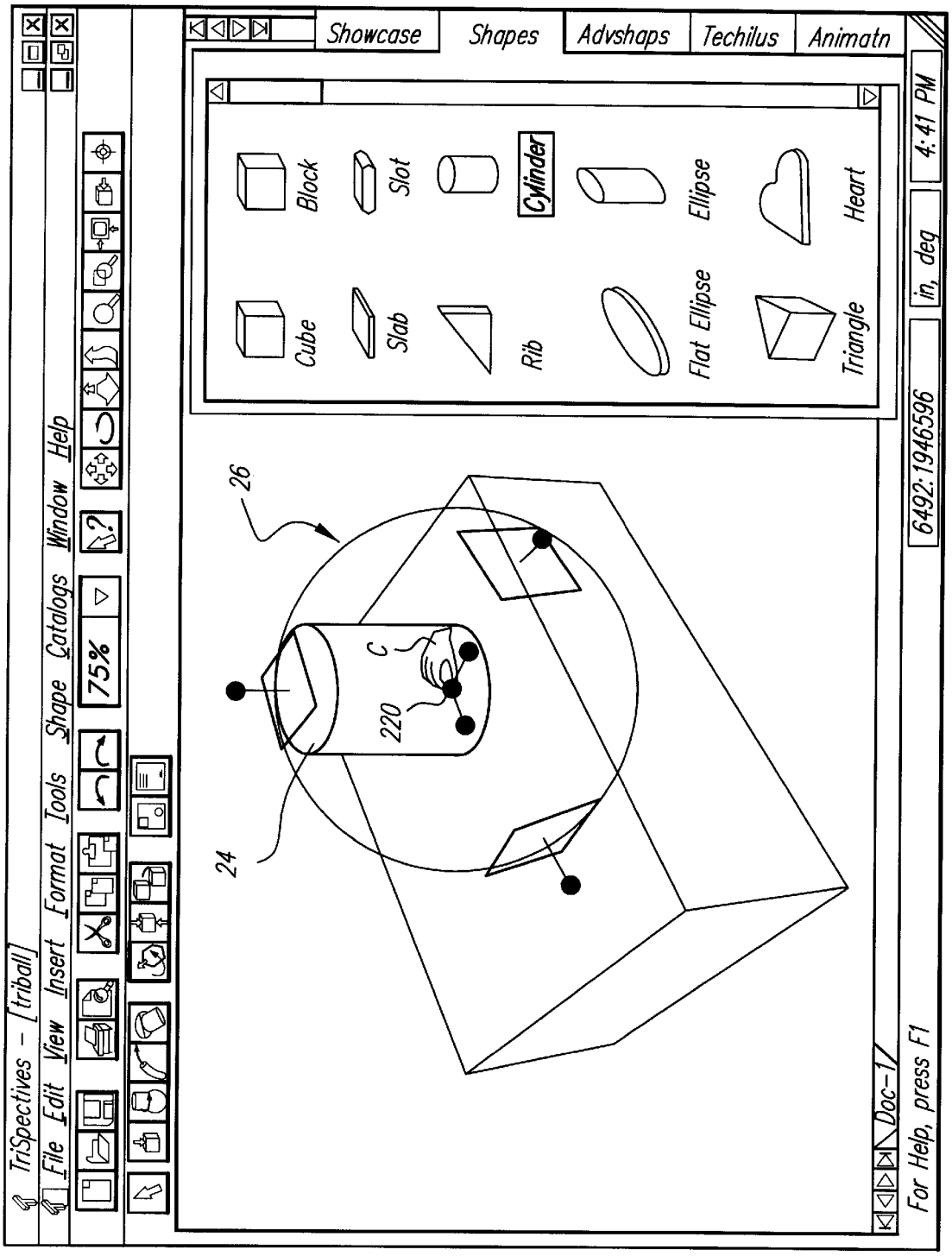
Figures 8, 13:
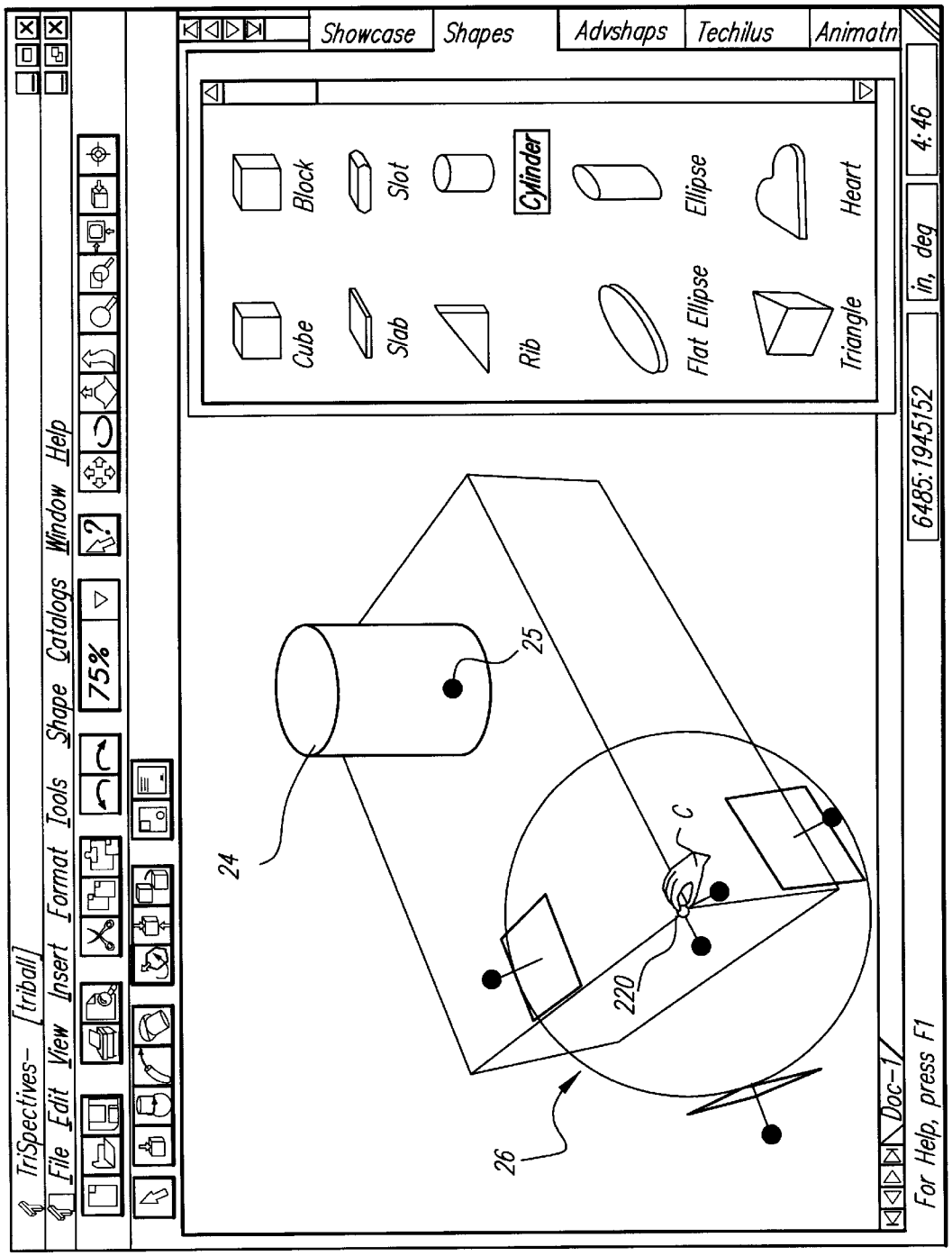
Figures 9, 13:
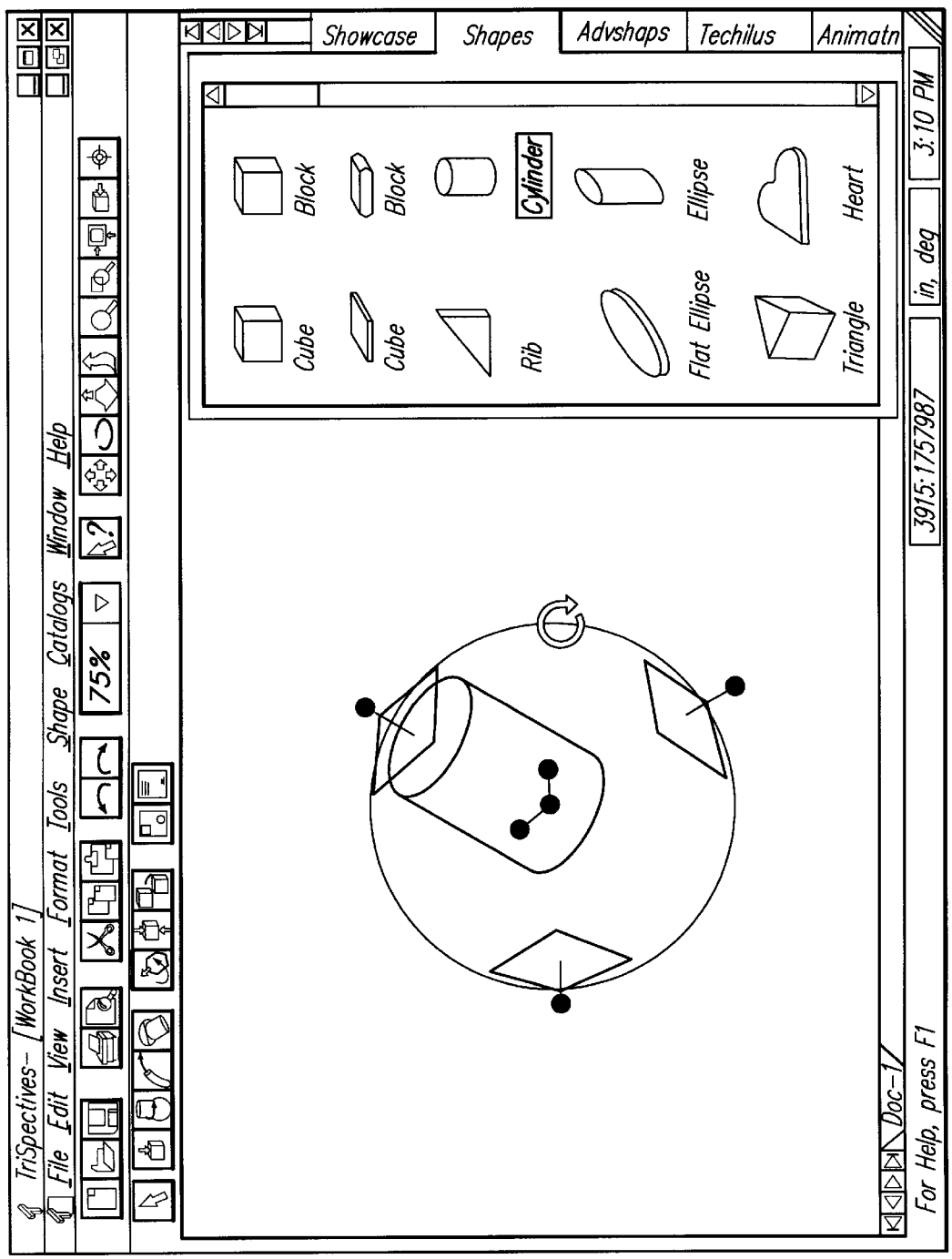

If it is determined at step 318 (see FIG. 3A) that mouse pointer C is over the spherial contour line 200, step 320 is executed. At step 320, mouse pointer C changes to another one of its movement representations, in particular a single curved or semi-circular arrow representation as shown in FIG. 13-9. In addition, spherical contour line 200 is highlighted (i.e., changes to a contrasting color). Thereafter, if the mouse left button 35L is clicked, an object constrained rotation movement mode is entered. In this regard, since it will be determined (via step 302) at step 364 of FIG. 3B that the mouse pointer C is over spherical contour line 200, the object constrained rotation (around screen Z axis) movement mode is entered as shown by step 366. Steps involved in the object constrained rotation (around screen Z axis) movement mode are shown in FIG. 7.

If it is determined at step 322 (see FIG. 3A) that mouse pointer C is over one of the object knob handles 212, step 324 is executed. At step 324, mouse pointer C changes to its grasping hand movement representation and knob handle 212 is highlighted. Thereafter, if the mouse left button 35L is clicked, further steps subsequent to step 368 of FIG. 3B are executed.

Figures 11, 13:
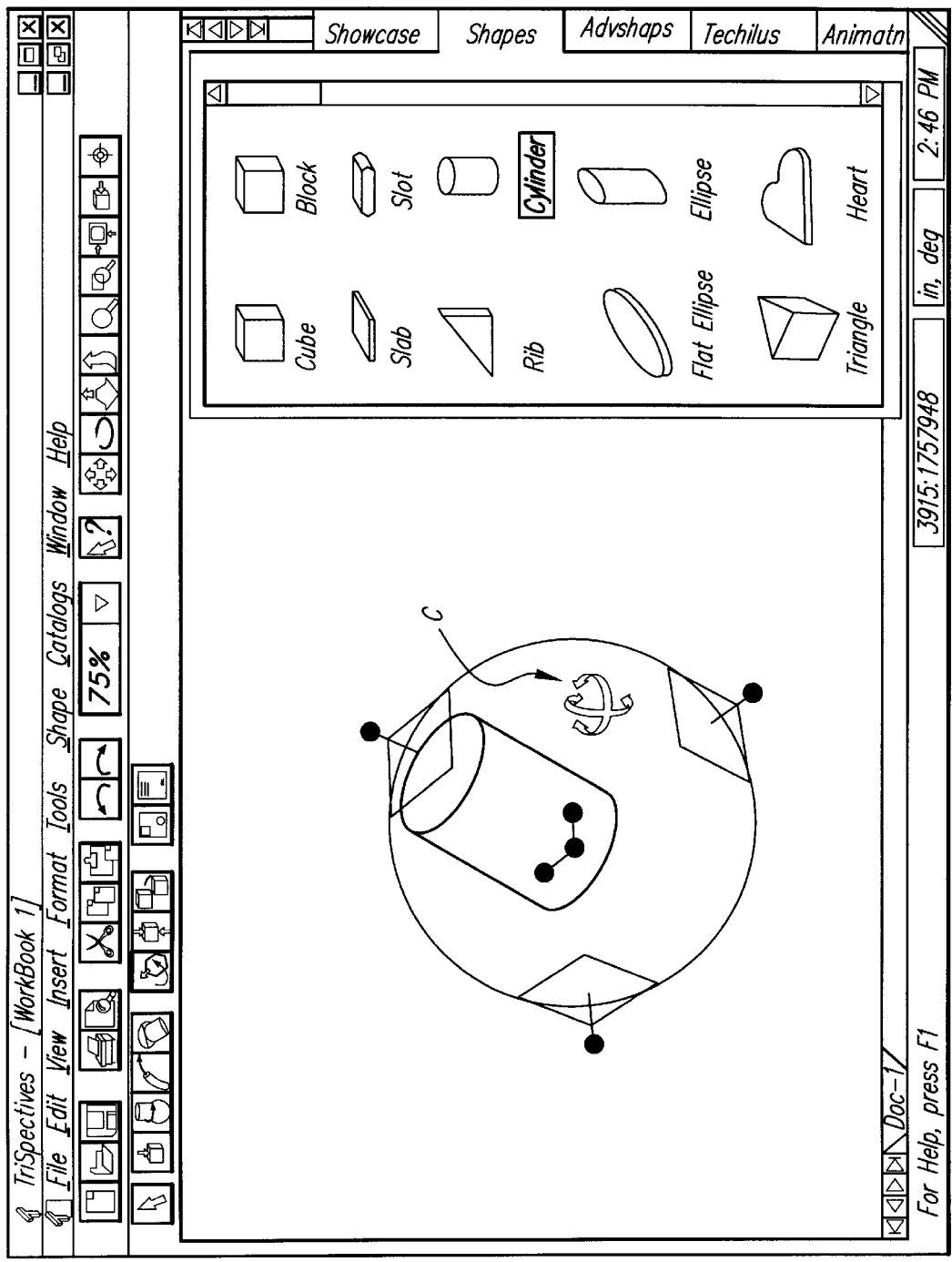

If it is determined at step 326 (see FIG. 3A) that mouse pointer C inside sphere S (i.e., inside the spherical contour line 202), step 328 is executed. At step 328, mouse pointer C changes to its four curved arrow movement representation as shown in FIG. 13-11. If it is determined at step 326 (see FIG. 3A) that mouse pointer C not inside sphere S, step 330 is executed. At step 330, mouse pointer C resumes its nominal representation.

If it is determined at step 368 of FIG. 3B, subsequent to a click of left mouse button 35L, that the pointer is over a knob handle 212, step 370 is executed. At step 370, it is determined if the object axis handle 218 has already been highlighted. If the axis handle 218 has already been highlighted, at step 372 an object constrained translation movement mode is entered. Steps involved in the object constrained translation movement mode are shown in FIG. 8. If the axis handle 218 was not previously highlighted, any dimensioning information appearing on screen 22 is cleared (step 374) prior to entering the object constrained translation movement mode at step 372.

If, after the mouse left button 35L has been clicked, it is determined at step 380 of FIG. 3B that the pointer is not inside of the sphere S (e.g., inside spherical contour line 202), step 382 is executed. At step 382 any dimensioning information appearing on screen 22 is cleared prior to returning to the "start" step of FIG. 3A.

Figure 10B:
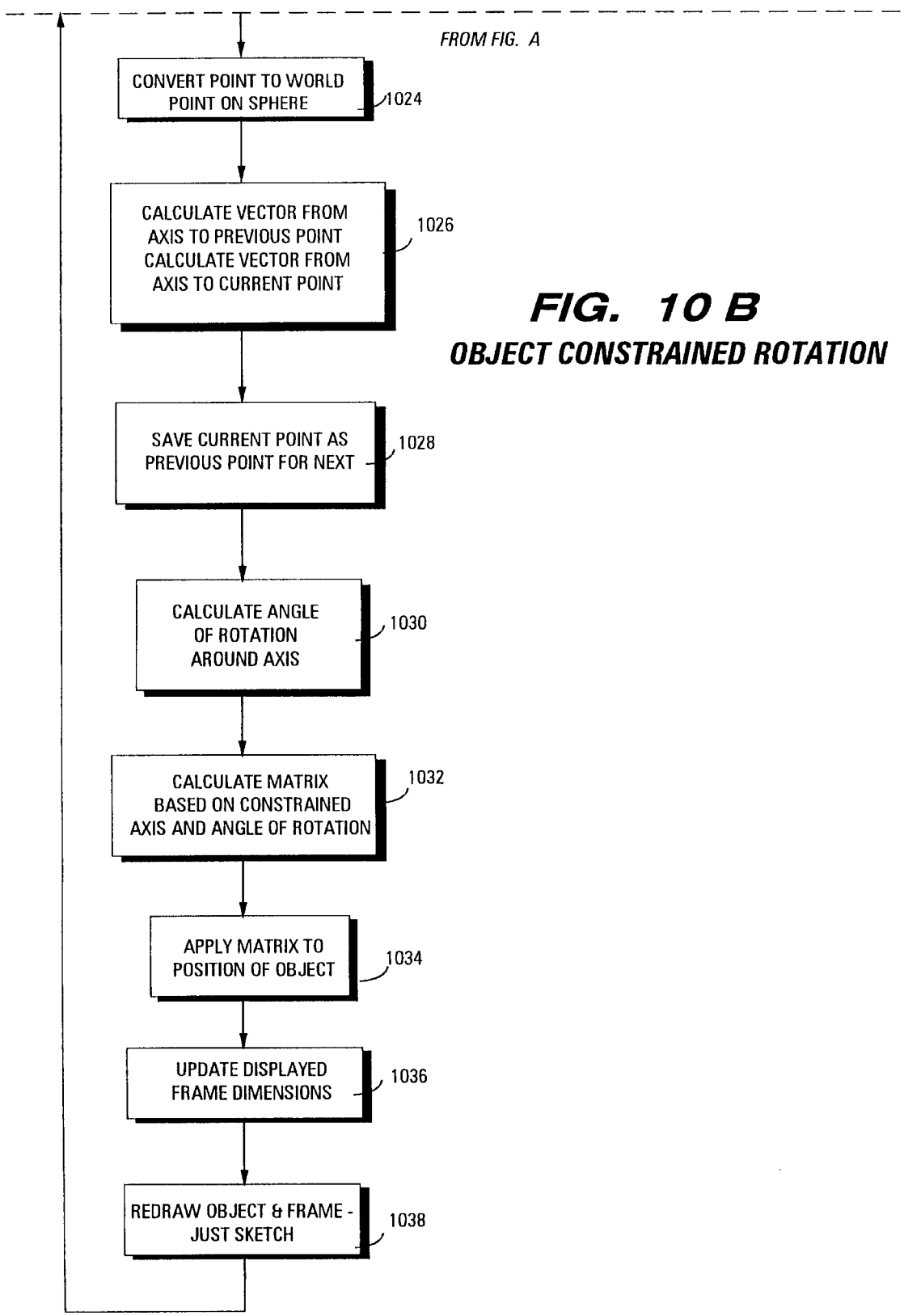

If, after the mouse left button 35L has been clicked, execution reaches step 390 of FIG. 3B, pointer C is known to be inside of the sphere S (e.g., inside spherical contour line 202). At step 390, it is determined whether there is a highlighted axis handle 218 on screen 22. If the determination at step 390 is negative, at step 392 an object unconstrained rotation movement mode is entered. Steps involved in the object unconstrained rotation movement mode are shown in FIG. 9. If the determination at step 390 is affirmative, at step 394 an object constrained rotation (about highlighted axis) movement mode is entered. Steps involved in the object constrained rotation (about highlighted axis) movement mode are shown in FIG. 10A and FIG. 10B.

As depicted in FIG. 3B, upon completion of each of the movement modes, execution returns to the start of execution (see FIG. 3A).

Operation: Drag Frame Center Knob Handle Movement Mode

FIG. 4 shows steps involved in the drag frame center knob handle movement mode. As explained above, the drag frame center knob handle movement mode is entered when a mouse button 35 has been clicked while the mouse pointer has assumed a movement (grasping hand) representation on the frame center knob handle 220 in the manner shown in FIG. 13-4).

Symbol 400 of FIG. 4 represents the fact that the frame center knob handle 220 has been clicked on and a mouse button 35 held down. At step 402, a determination is made whether the pointer C is being dragged (that is, whether either the mouse left button 35L or the mouse right button 35R is being held down). If no pointer drag is occurring, the object movement mode of FIG. 4 is terminated as reflected by step 404.

If the pointer C is being dragged, a check is made at step 406 whether pointer C is over the anchor 25 of the displayed object. If pointer C, in its grasping hand movement representation, is over anchor 25, the center of frame 26 is established to have the same screen coordinates as anchor 25 (see step 408).

If pointer C, in its grasping hand movement representation, is being dragged beyond anchor 25, a "hit test" is performed with respect to the contents of the screen. A "hit test", shown as functionality 130F in FIG. 2, is a determination whether pointer C has the same coordinates as any one of a predetermined set of items and features of items displayed on the screen. If the pointer C does not have the same screen coordinates as one of the items in the set, frame center knob handle 220 (and frame orientation handles 222 to which handle 220 is tied) is left at its last position (step 414). For example, if pointer C, while grasping frame center knob handle 220, were to move beyond the perimeter of drum 24, for example, frame center knob handle 220 would be left at the perimeter of drum 24.

If pointer C, while grasping frame center knob handle 220, is moved and is over a "hit" item, at step 414 a hit point in space of the displayed object being positioned is calculated. Then, at step 416, the entire object movement reference frame 26 is moved so that its frame center knob handle 220 is at the calculated (new) hit point (step 416).

Execution of the drag frame center knob handle movement mode continues by looping back to step 402 to check for further dragging of pointer C. When dragging ceases, the movement mode of FIG. 4 is terminated (step 404).

FIG. 13-7 and FIG. 13-8 depict dragging of frame center knob handle 220 of frame 26 from an anchor 25 of a first displayed object (i.e., drum 24), to a corner of a second displayed object (a rectangular solid). Coordinates of the interiors of drum 24 and the rectangular solid are both within the predetermined set of items upon which the hit test is performed. Moreover, since drum 24 and the rectangular solid are shown to be contiguous, pointer C remains in its movement representation (grasping hand) through its travel to the relocated position at the corner of the rectangular solid. However, if the two displayed objects were separated, in the gap between the two displayed objects the pointer C would acquire its nominal representation, and then resume its movement representation (grasping hand) once over the rectangular solid.

Operation: Drag Frame Orientation Knob Handle Movement Mode

FIG. 5 shows steps involved in the drag frame orientation knob handle movement mode. As explained above, the drag frame orientation knob handle movement mode is entered when a mouse button 35 has been clicked while the mouse pointer has assumed a movement (grasping hand) representation on one of the frame orientation knob handles 222.

Symbol 500 of FIG. 54 represents the fact that one of the frame orientation knob handles 222 has been clicked on and a mouse button 35 held down. The particular one of the frame orientation knob handles 222 which is clicked on and grasped by the grasping hand pointer C is referenced hereinafter as the "selected" knob handle, the unselected other one of the frame orientation knob handles 222 is referenced as the "other" orientation knob handle.

At step 502 the screen coordinates of the selected knob handle are acquired. Then, at step 504 a check is made to determine if the last click of a mouse button occurred on the "other" orientation knob handle. If the last click of a mouse button occurred on the "other" orientation knob handle, it will be realized that a second phase of a special two phase frame orientation procedure is occurring, and even numbered steps 530–540 will be executed in the manner hereinafter described.

Assuming that the second phase of a two phase orientation procedure is not occurring, a check is made at step 506 whether the pointer C is still being dragged. If not, the movement mode of FIG. 5 terminates (step 508). If dragging is continuing, a "hit test" (using functionality 130F of FIG. 2) is performed at step 510 against the contents of the page (e.g., the contents of screen 22). If no item is hit during the hit test of step 510, the selected orientation handle is left at its last position (step 514). On the other hand, it something is hit, the hit point is transformed to a local position (step 516). Then, at step 518, a first vector is calculated from the center of sphere S to the starting point at which the selected orientation knob began its drag. A second vector is calculated from the center of sphere S to the transformed hit point. At step 520 an axis of rotation and angle of rotation are calculated using the first and second vectors calculated at step 518. At step 522 the object movement frame 26 is rotated through the axis and angle of rotation determined from step 520. At step 524 the frame 26 is redrawn. Redrawing of frame 26 is accomplished using the draw functionality 130G shown in FIG. 2.

After redrawing of frame 26 at step 524, execution loops back to step 506 to determine if dragging is still occurring. If dragging is on going, even numbered steps 510 through 524 are repeated as appropriate. If dragging has ceased, the drag frame orientation handle movement mode of FIG. 5 is terminated (step 508).

When a second phase of a two phase orientation procedure is occurring, step 530 is executed to calculate an axis of rotation. In particular, the axis of rotation is collinear with the center coordinates of frame 26 and the coordinates of the "other" orientation knob handle 222. At step 532 a determination is made whether the selected knob handle is being dragged. If not, at step 534 the drag frame orientation movement mode of FIG. 5 is terminated. If dragging continues, at step 536 a "hit test" of functionality 130F is performed against the contents of the screen. If nothing is hit on screen 22, the selected frame orientation knob handle is left at its last position (step 540), and execution loops back to step 532. If something is hit, even numbered steps 542 through 550 are performed prior to a loop back to step 532.

Steps 542 through 550 are similar to even numbered steps 516–524 previously discussed for resulting in a redrawn frame 26. However, the vectors calculated at step 544 differ from those calculated at step 518. In particular, at step 544 a first vector is calculated from the axis determined at step 530 to the starting point of dragging of the selected orientation knob handle 222, and a second vector is calculated from the axis determined at step 530 to the transformed hit point of step 542. Then, at step 546, an angle of rotation about the axis determined at step 530 is determined. It may turn out that the axis of rotation has not changed.

Upon completion of the redraw of step 550, execution loops back to step 532 to check for further dragging. If dragging of pointer C has ceased, execution of the movement mode of FIG. 5 is terminated.

Operation: Object Linear Drag Movement Mode

Steps involved in the object planar drag movement mode are shown in FIG. 6. Symbol 600 represents the fact that the object planar drag movement mode is entered when a mouse button 35 has been clicked while mouse pointer C is over an object plane handle 214. At this juncture, pointer C has a movement representation of four straight, outwardly pointing orthogonal arrows as shown in FIG. 13-6, and the perimeter of the object planar handle 214 is highlighted as shown in FIG. 13-6.

At step 602 an equation representation of the plane in which object plane handle 214 lies is computed. Then, at step 604 the coordinates of the clicked point on the plane in world space are calculated. As used herein "world" space refers to three dimensional space, whereas screen space refers to the two dimensional space of screen 22.

At step 606 a check is made whether pointer C is being dragged. If not, a step 608 a full redraw of the displayed object (i.e., drum 24) occurs and the movement mode of FIG. 6 is terminated. As used herein, a "full" redraw means that the displayed object is reproduced in its entirety. A "full" redraw is in contrast to what is termed as a "partial" redraw or "sketch", in which only selected features of the displayed object (e.g., a perimeter of a surface of the displayed object) are reproduced in a displaced location on screen 22. When a sketch is generated, the entire displayed object is left at its original location, the sketch occurring at a displaced location as indicated by movement of pointer C.

If dragging of the object plane handle 214 has occurred, at step 610 the current screen coordinates of pointer C are determined. Then, at step 612, a "ray" is shot from a camera to the current position of pointer C, and an point of intersection of the ray with the plane (determined at step 602) is calculated. In essence, step 612 involves calculating the position of the pointer C on the plane of the planar handle 214. That is, determining the projection of the pointer on the screen 22 on the plane of the planar handle 214.

At step 614 incremental movement in the plane from the previous point to the current point is calculated. At step 616 the position of the displayed object (e.g., drum 24) is modified to reflect the incremental movement detected/ calculated at step 614. At step 618 the current point (as determined at step 610) is remembered for use during the next drag (i.e., at step 614 of the next drag). Then, at step 620 a sketch of the displayed object showing its modified position as computed at step 616 is provided.

Upon completion of the sketching of step 620, execution loops back to step 606 to determine if further dragging occurs. If further dragging occurs, even numbered steps 610–620 are repeated. When dragging has ceased, the displayed object is fully redrawn, which redrawing occurs in a new position on screen 22 if pointer C was moved during the movement mode of FIG. 6.

Operation: Constrained Object Rotation Movement Mode

Steps involved in the object constrained rotation (around screen Z axis) movement mode are shown in FIG. 7. Symbol 700 reflects the fact that the object constrained rotation (around screen Z axis) movement mode is entered when a mouse button 35 has been clicked and held down while the pointer C is over on spherical contour line 202 of sphere S. At this juncture, pointer C acquires a semi-circular arrow movement representation on spherical contour line 200 of sphere S in the manner shown in FIG. 13-9.

At step 702 the screen coordinates of pointer C are determined, and at step 704 the point on sphere C in world space corresponding to the position of pointer C are calculated. At step 706, a check is made whether pointer C is being dragged. If no dragging has occurred, the displayed object is fully redrawn and the movement mode of FIG. 7 is terminated.

When dragging of pointer C is occurring, at each instance of drag the coordinates of pointer C are determined at step 710. At step 712 a determination is made whether the position of pointer C as dragged are inside of sphere S. If the determination of step 712 is negative, a determination is made at step 716 whether the position of pointer C as dragged are outside of sphere S. If the determination at step 712 is affirmative, step 714 is executed; if the determination at step 716 is affirmative, step 720 is executed. Steps 714 and 720 involve a mapping of the wayward cursor drag to a point on spherical contour line 202.

At step 718 it is known that the dragged pointer C is still on spherical contour line 202 as desired, albeit at a new position to which it was dragged. At step 722, the world space coordinates of the new position of pointer C (as determined at step 710) are calculated. Then, at step 724, the displayed object is rotated by the same amount of rotation as required by the drag of pointer C. At step 726 the frame 26 is redrawn and the displayed object is merely sketched.

Thus, execution of the steps of FIG. 7 involves a potential rotation of the displayed object about the "Z" axis of the screen. The Z axis of the screen is an axis out of the plane of screen 22. After each sketching of the displayed object at step 726, execution loops back to step 706 for a check whether further dragging occurs. After dragging has ceased, the displayed object is fully redrawn and the movement mode of FIG. 7 is terminated (step 708).

Operation: Object Constrained Translation Movement Mode

Steps involved in the object constrained translation movement mode are shown in FIG. 8. At step 800, a mouse button 35 is clicked and held down while the pointer P is over a knob handle 212. At this juncture the pointer C disappears and the axis handle 218 connected to the knob handle 212 is highlighted. Also, a highlighted temporary knob handle 212' is generated as described below with reference to FIG. 13-10.

At step 802 calculations are performed to determine the direction of the of the corresponding handle axis 218 in both world space and screen space. Then, at step 804, a relationship between the two directions determined at step 802 is deduced.

If it is determined at step 806 that pointer C is being dragged, even numbered steps 820 through 832 are executed. When it is determined at step 806 that pointer C is not being dragged, even numbered steps 808 through 812 are executed.

When pointer C is not being dragged, it is determined at step 808 whether right mouse button 35R was down during the last drag. If the right mouse button 35R was down during the last drag, an "end of right button drag" operation is executed (step 812). The "end of right button drag" operation is described in detail with reference to FIG. 11 hereof. If the right mouse button 35R was not down during the last drag, a full redraw of the displayed object takes place and the movement mode of FIG. 8 is terminated (step 810).

When dragging has occurred, the current coordinates of pointer C are determined at step 820 (and are reference hereinafter as the current point). At step 822, motion in world space corresponding to the drag on the screen is calculated. At step 824 a new world space point along the direction of the handle axis 218 (such direction having been computed at step 802) is determined in accordance with the motion of step 822. Then, at step 826, the displayed object is moved or displaced along the direction of handle axis 218 by an amount corresponding to the displacement (motion of step 824) between the previous point and the current point (of pointer C).

At step 828, information regarding a displacement vector and displacement dimensions are updated. An understanding of displacement vector and displacement dimensions is gained from a discussion below of FIG. 13-10.

At step 830, the current point (determined at step 820) is saved for usage as the previous point for any next drag. At step 832 the displayed object is sketched and frame 26 is redrawn.

If dragging continues, even numbered steps 820 through 832 of FIG. 8 are repeated with the former current point becoming the previous point and with a new point being determined at step 820.

FIG. 13-10 shows an instance of operation of the object constrained translation movement mode are shown in FIG. 8. Shown particularly in FIG. 13-10 is highlighted knob handle 212, highlighted axis handle 218, and a highlighted temporary knob handle 212' at the end of axis handle 218 opposite knob handle 212 on contour line 202 of sphere S. FIG. 13-10 also depicts by sketching the movement of displayed object 24 from its original location OL to its displaced location DL along highlighted axis handle 218. FIG. 13-10 also shows the display of a displacement vector and a displacement dimension through which the displayed object (i.e., drum 24) has been translated. The displacement dimension is shown as the number "73.22" in FIG. 13-10, and is a numerical indication of the degree of translation along axis 218. The displacement vector being the line segments extending on either side of the number "73.22" and terminating in an arrow head.

FIG. 13-10 also illustrates what has been referred to herein as a "sketch". As indicated previously, in a sketch or partial redraw only selected features of the displayed object (e.g., a perimeter of a surface of the displayed object) are reproduced in a displaced location on screen 22. FIG. 13-10 shows highlighted displaced circular perimeters 24D of opposing circular end surfaces of drum 24. The partial drawing of the displaced displayed object in its displaced location, along with the depiction of the entire displayed object in its original location, affords the user a better feel for the movement which is undergone by the displayed object in accordance with movement of pointer C.

Operation: Object Unconstrained Rotation Movement Mode

Steps involved in the object unconstrained rotation movement mode are shown in FIG. 9. Symbol 900 reflects that the object unconstrained rotation movement mode is entered when a mouse button 35 has been clicked while the mouse pointer is inside sphere S with an axis handle not having been previously highlighted. During the object unconstrained rotation movement mode of FIG. 9, pointer C has four curved arrow movement representation shown in FIG. 13-11.

At step 902 the screen coordinates of pointer C are ascertained. At step 904 these screen coordinates are used to calculate a current point relative to sphere S in world space.

At step 906 a check is made whether a drag of pointer C has occurred. If no drag has occurred, there is a full redraw of the displayed object and the movement mode of FIG. 9 is terminated (step 908).

If a drag of pointer C has occurred, the coordinates of the position to which pointer C has been dragged is ascertained at step 910. If the pointer C has been dragged outside of sphere S (determined at step 912), execution loops back to step 906. Elsewise, execution continues at step 914 in which the location determined at step 910 is calculated relative to sphere S in world space. At step 916, computations are made for determining the rotation of the displayed object according to the amount of rotation on sphere S.

Figures 12, 13:
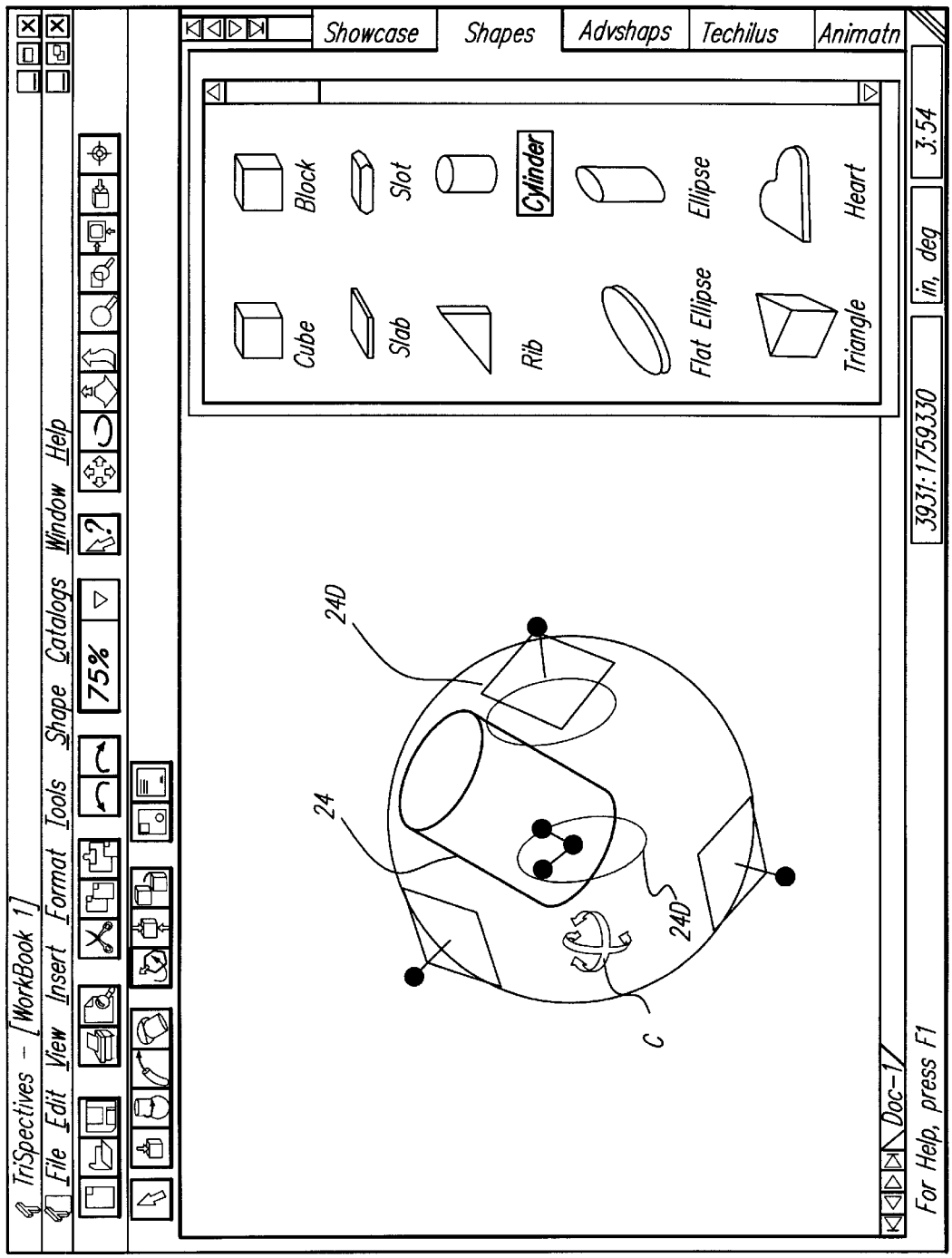
Figure 13:
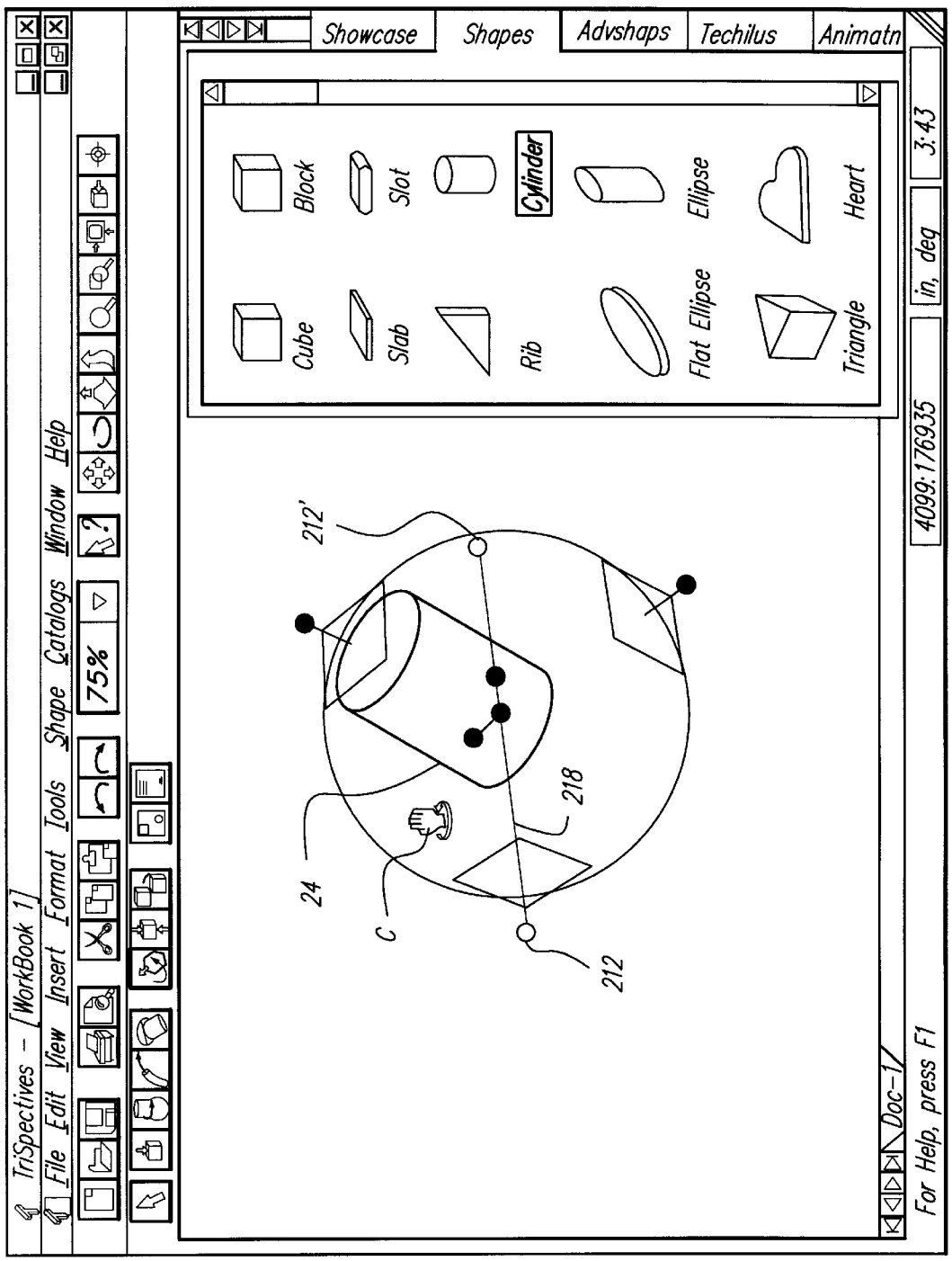

At step 918, the displayed object is sketched and frame 26 is drawn. FIG. 13-12 shows a sketch according to step 918, wherein selected features of drum 24 are shown in the displaced location. In particular, FIG. 13-12 shows only selected features of the displayed object (e.g., a perimeter of a surface of the displayed object). FIG. 13-12 shows highlighted displaced circular perimeters 24D of opposing circular end surfaces of drum 24, thereby offering a sense of the unconstrained rotation of the displayed object relative to the original location of the displayed object.

After the sketching of the displayed object at step 918, execution loops back to step 906 for a further check whether pointer C is being dragged. If dragging continues, even numbered steps 910 through 918 are again executed. Otherwise, a full redraw of the displayed object occurs and the movement mode of FIG. 9 is terminated (step 908).

Operation: Object Constrained Rotation Movement Mode

Steps involved in the object constrained rotation (about highlighted axis) movement mode are shown in FIG. 10A and FIG. 10B. As explained above, the object constrained rotation (about highlighted axis) movement mode is entered when a mouse button 35 has been clicked while the mouse pointer is inside sphere S and when an axis handle 218 has been just previously highlighted.

Symbol 1000 of FIG. 10A reflects the fact that the object constrained rotation (about highlighted axis) movement mode was initiated by clicking on one of the object knob handles 212. As indicated previously, this caused highlighting of the selected object knob handle 212, as well as highlighting of the axis handle 218 extending to the selected knob handle 212 and generation of a highlighted temporary knob handle 212' (see FIG. 13-13). Pointer C changed to its grasping hand representation when over knob handle 212, but subsequent moving of pointer C inside sphere S causes pointer C to acquire its rotating hand representation as shown in FIG. 13—13. The rotating hand representation includes a fisted hand with a directional arrow partially encircling the wrist.

At step 1002 a calculation is made to determine in three dimensional (world) space the axis along which knob handle 212 lies. Step 1004 reflects detection of a click and holding down of a mouse button 35 within spherical contour line 202. At step 1006 the position of pointer C at the click is converted from the two dimensional screen space to the three dimensional world point on sphere S.

At step 1008 a check is made whether pointer C is being dragged. If dragging is not continuing, it is determined at step 1010 whether the right mouse button 35R had been down during the last drag. If the right mouse button 35R had been down, an "end of right button drag" operation is executed (step 1014). The "end of right button drag" operation is explained hereinafter with respect to FIG. 11. If the right mouse button 35R had been down, a full redraw of the displayed object occurs and the movement mode of FIG. 10A and FIG. 10B is terminated.

If the pointer C had been dragged, the current location of pointer C is ascertained at step 1020. At step 1022 inquiry is made whether pointer C is still inside sphere S. If pointer C is no longer in sphere S, execution loops back to step 1008 for a further drag check. Otherwise, various processing steps depicted in FIG. 10B are executed.

At step 1024 of FIG. 10B, the current screen point of pointer C as ascertained at step 1020 is converted to a world point on sphere S. Then, at step 1026, a first vector is calculated from axis 218 to a previous point of pointer C and a second vector is calculated from axis 218 to the current point or location of pointer C. At step 1028 the current point is saved for use as a previous point in connection with the next drag of pointer C.

At step 1030 an angle of rotation from the previous point to the current point is computed about axis 218. Then, at step 1032, a matrix based on the constrained axis of rotation (axis 218) and the angle of rotation is constructed. At step 1034, the matrix constructed at step 1034 is applied to the current position of the displayed object. Thereafter, at step 1036, updated dimension information is computed. Finally, at step 1038, frame 26 is drawn and the displayed object is sketched at its displaced (rotated) location. After the sketching of step 1038, execution jumps back to step 1008 for another drag check.

Figures 13, 14:
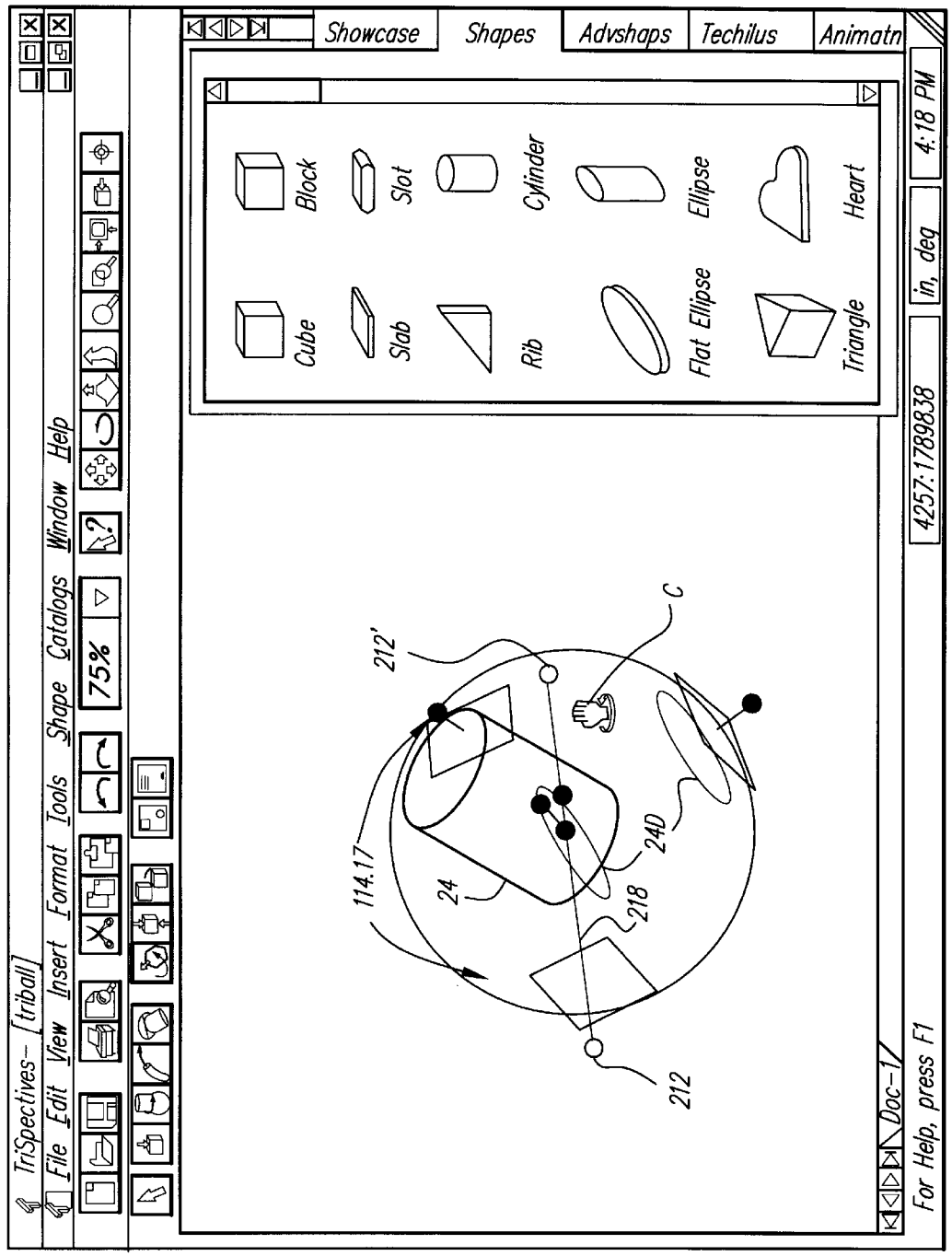

FIG. 13-14 shows an instance of a sketch of step 1038, showing particularly a displacement of displayed object 24 by way of highlighted displaced circular perimeters 24D of opposing circular end surfaces of drum 24. FIG. 13-14 also shows the display of a displacement vector and a displacement dimension through which the displayed object (i.e., drum 24) has been rotated. The displacement dimension is shown as the number "114.17" in FIG. 13-14, and is a numerical indication of the degree of rotation about axis 218. The displacement vector is formed by arc segments extending on either side of the number "114.17" and terminating in an arrow head.

Operation: End Of Right Button Drag

FIG. 11 shows steps involved in the "end of right button drag" operation. The "end of right button drag" operation is entered from the object constrained translation movement mode (see step 812) and the object constrained rotation (about highlighted axis) movement mode (see step 1014).

Figures 13, 14, 15:
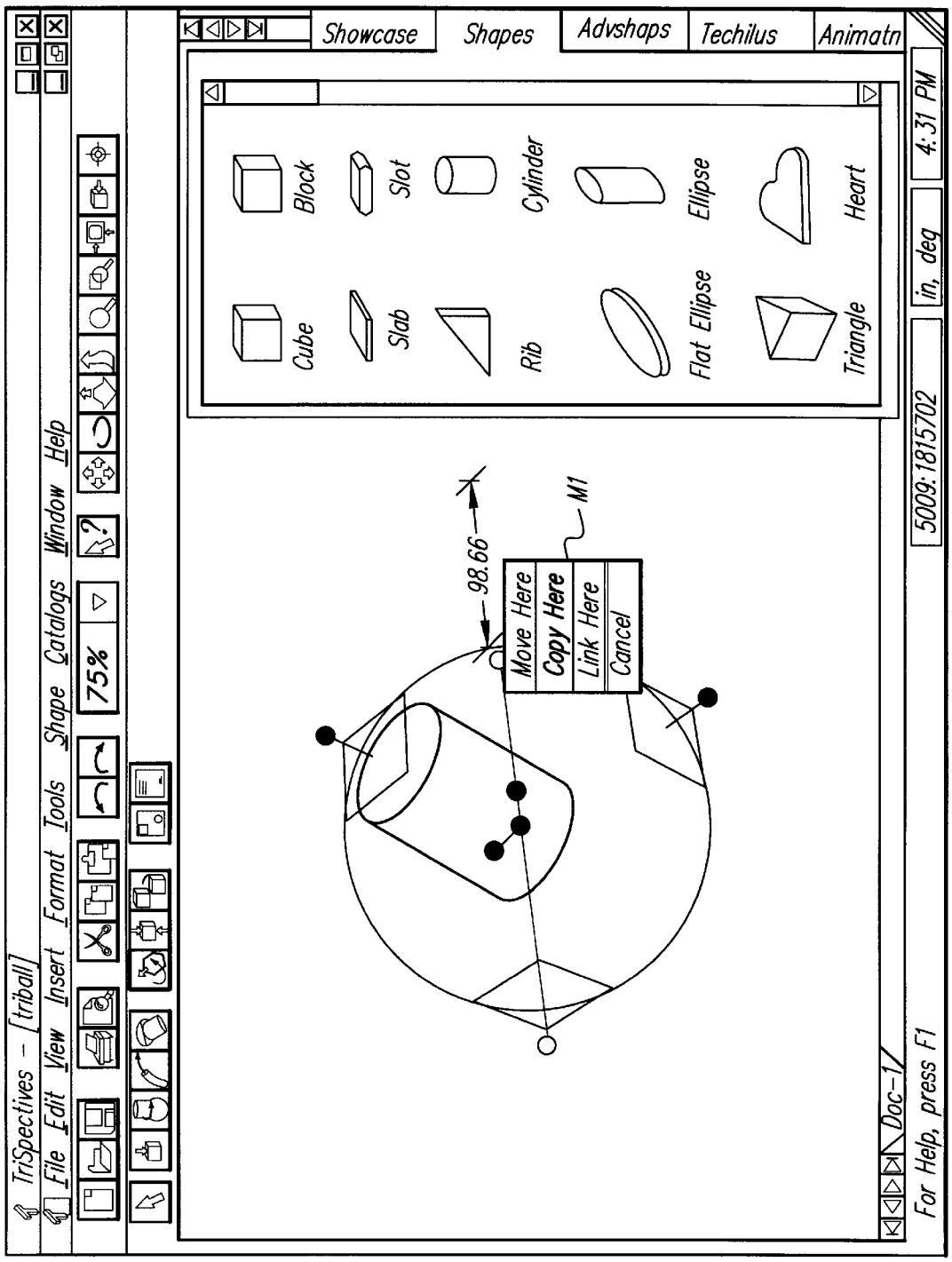
Figures 13, 14, 15, 16:
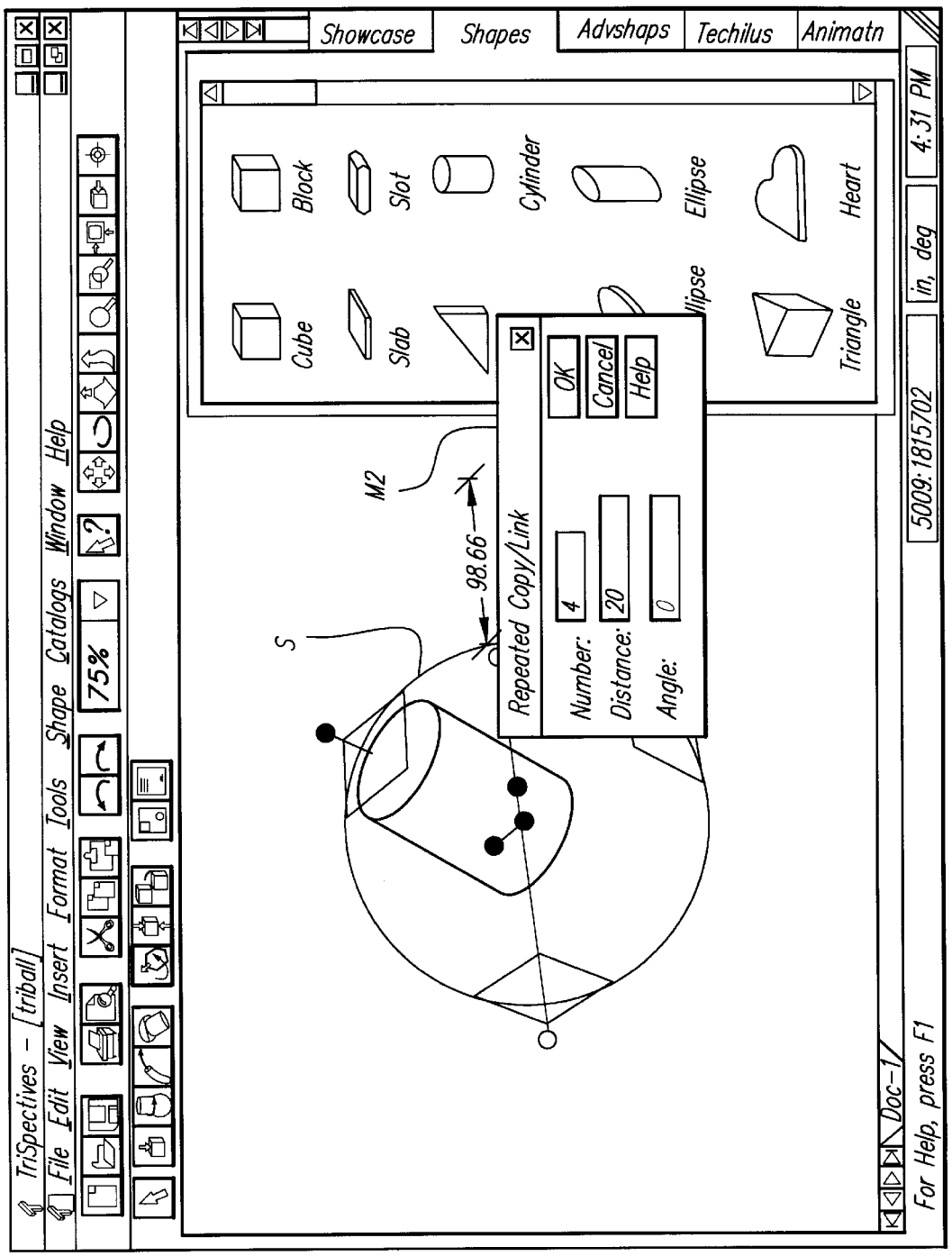
Figures 13, 14, 15, 16, 17:
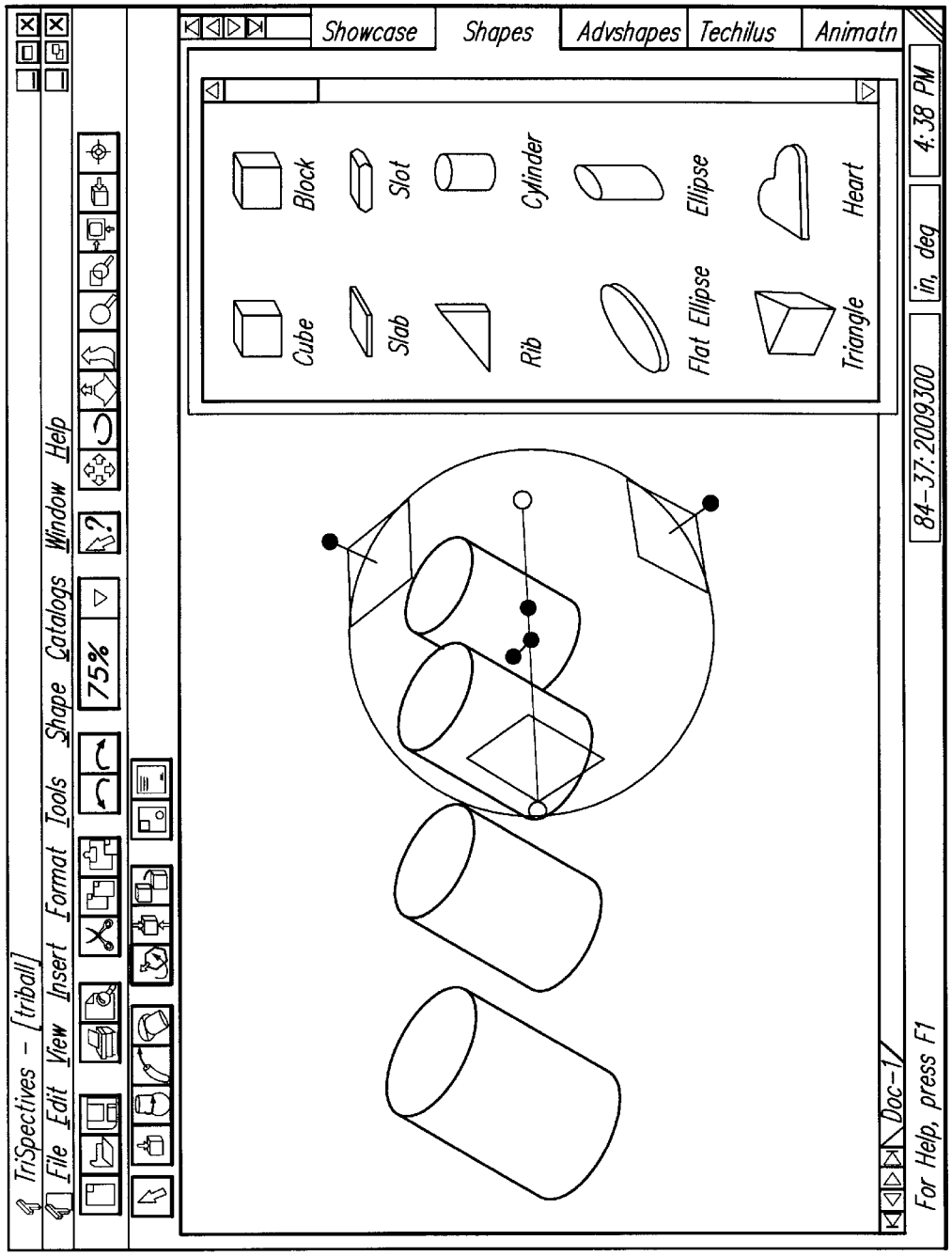
Figures 13, 14, 15, 16, 17, 18:
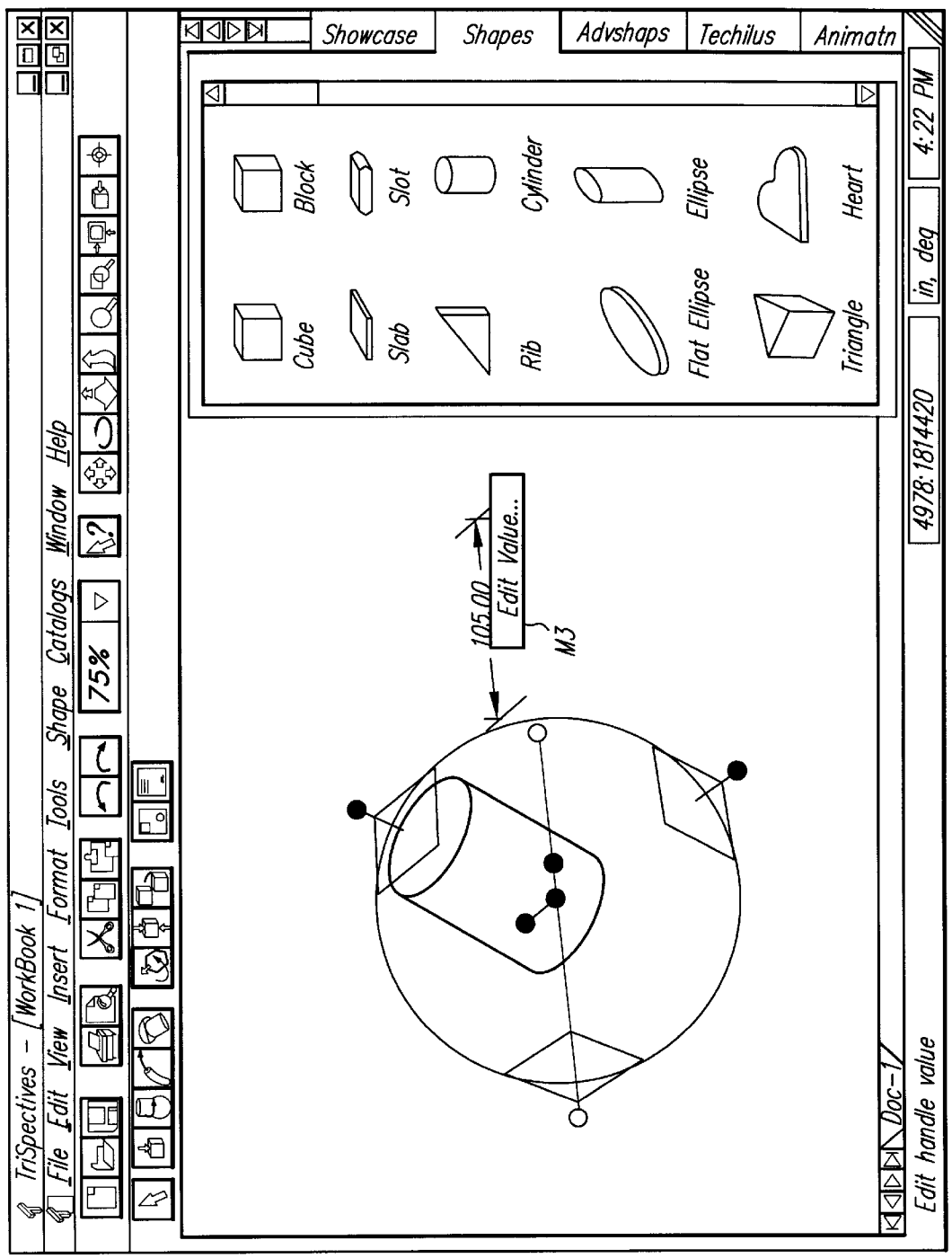
Figures 13, 14, 15, 16, 17, 18, 19:
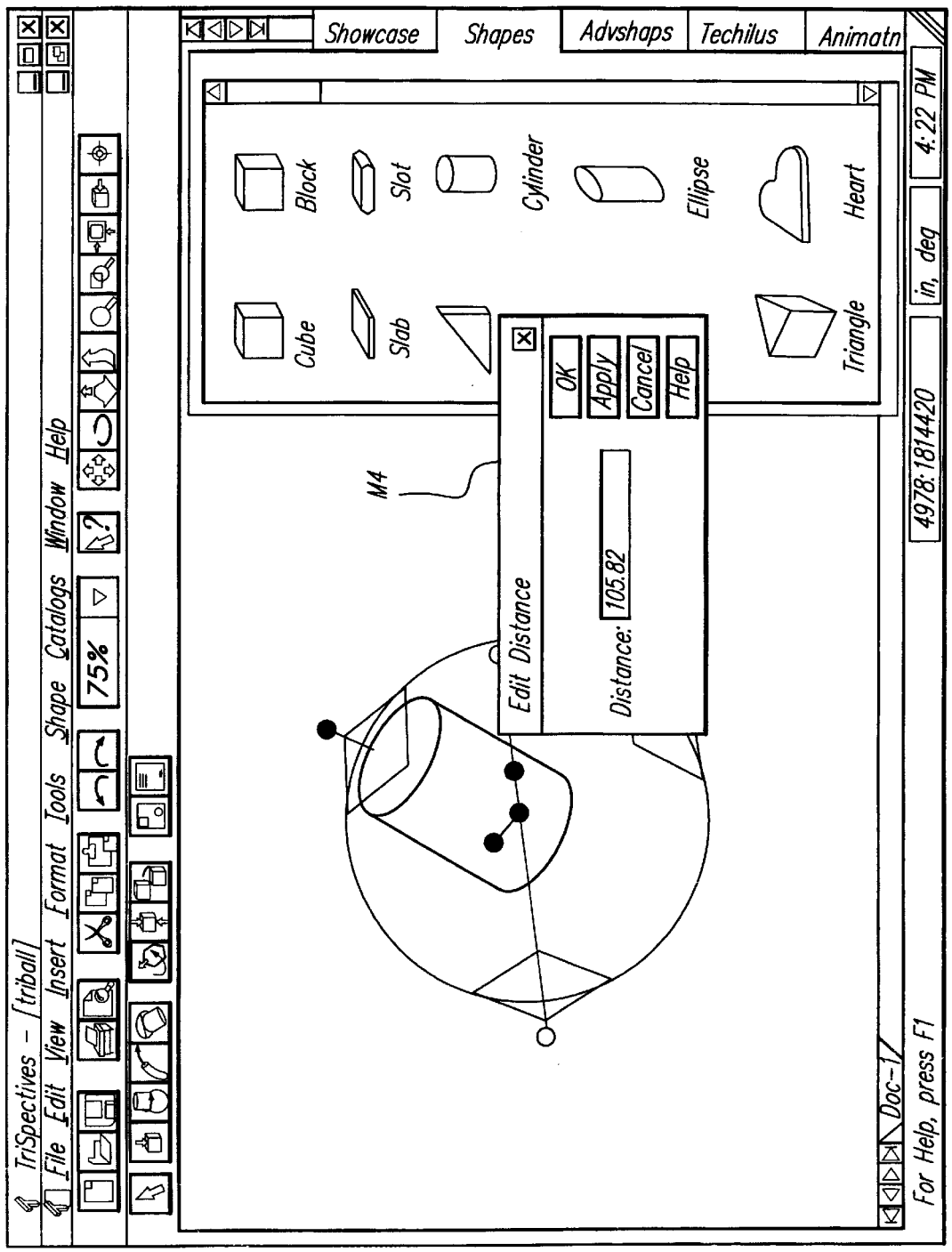

At step 1100, a "pop-up" menu M1 is generated on screen 22. Pop-up menu M1 is shown in FIG. 13-15 as providing several options, including a "move here" option; a "copy" option; a "link" option; and a "cancel" option.

If at step 1102 it is ascertained that the user selected by click of a mouse button 35 the "move here" option, step 1104 is executed. At step 1104 the displayed object is fully redrawn at its displaced location and the operation of FIG. 11 is terminated.

If at step 1106 it is ascertained that the user selected by click of a mouse button 35 the "cancel" option, steps 1108 and 1110 are executed. At step 1108 the displayed object is moved back to its original location; at step 1110 the displayed object is fully redrawn at its displaced location and the operation of FIG. 11 is terminated.

If at step 1112 it is ascertained that the user selected by click of a mouse button 35 the "copy" option, even numbered steps 1114 through 1120 are executed. At step 1114 a dialog box M2 is displayed on screen 22 (see FIG. 13-16). Dialog box M2 inquires of the user (1) the number of copies of the displayed object which are to be generated, and (2) the distance and/or angle by which the copies are to be separated. FIG. 13-16 shows a request for four copies spaced apart by twenty units, which type of request is input and processed at step 1116.

In response to the specification/request of step 1116, at step 1118 four copies of the displayed object are displayed as shown in FIG. 13-17.

If execution reaches step 1130, it is realized that a "link" option was selected. At step 1132 a dialog box similar to box M2 of FIG. 13-16 is displayed, in like manner as at step 1114. Then, at step 1134, in similar manner as at step 1116, the user specifies the number of linked copies and the separation therebetween. At step 1136 the copies and linkages are created, and then fully drawn at step 1138. As a result of the linking, whatever action is taken with respect to either the copy or the original is also taken with respect to the other.

Operation: Editing Dimension Value

Numerical dimension values such as linear translation values and rotational values have been illustrated and described previously with respect to FIG. 13-10 and FIG. 13-14. While the displayed dimension values show the displacement of the displayed object as actually depicted on screen 22, the present invention provides the user with the capability of adjusting the displacement by a magnitude other than the magnitude currently displayed on the screen. For example, whereas the user may have moved drum 24 linearly by a distance of "73.22" units in FIG. 13-10, the user may wish for the drum 24 to be moved only "70.00" units. The present invention accommodates this desired displacement adjustment using the editing dimension operation of FIG. 12.

At step 1200, the user moves pointer C over the text of the dimension (e.g., over the "73.22" value in FIG. 13-10). At this juncture, pointer C changes to its hand representation. Then, at step 1202, the user clicks right mouse button 35R, whereupon the "edit value" pop-up menu M3 of FIG. 13-18 appears. The user then clicks the mouse left button 35L on the "edit value" pop-up menu M3, causing the "edit distance" pop-up menu M4 of FIG. 13-19 to appear. The user then edits the distance value in menu M4 (at step 1210), and then hits "OK". The draw functionality then draws the displayed object at the displacement distance specified by the user at step 1208.

Mathematical operations undergirding the displacements, rotations, and transformations described herein are understood by the person skilled in the art with reference, particularly with reference to such sources as classical texts on coordinate transformation, vector processing in three dimensions, rotational theory and the like.

While the invention has been particularly shown and described with reference to the preferred embodiments thereof, it will be understood by those skilled in the art that various alterations in form and detail may be made therein without departing from the spirit and scope of the invention. For example, it should be understood that user input devices other than a mouse can be employed, such as a trackball or other device facilitating movement of a pointer on a screen. Moreover, many aspects of the invention are not limited to a spherically depicted object movement reference frame, but could apply to reference frames of other geometrical shapes as well. Furthermore, the square shapes of planar handles 214 and the circular shapes of knob the knob handles shown herein are not exhaustive of the types of shapes these handles may acquire.

The embodiments of the invention in which an exclusive property or privilege is claimed are defined as follows:

1. A method for providing a visually perceptible movement of a displayed object depicted on a display device, the display device having a pointer displayed thereon, the pointer being movable on the display device in accordance with operation of a user input device; the method comprising:

providing a movement reference frame on the display device, the movement reference frame being shown on the display device as a three dimensional sphere, the movement reference frame having at least one object handle set visually provided on the display device, the object handle set comprising both a planar handle and a knob handle, the planar handle comprising a bounded geometrical shape in a plane tangent to the sphere;

using the user input device to enter an object movement mode;

moving the displayed object, during the object movement mode, through a movement displacement, the movement displacement being a first type of movement when the pointer is in a neighborhood of the planar handle and a second type of movement when the pointer is in a neighborhood of the knob handle, the displacement movement being in accordance with actuation of the user input device during the object movement mode.

2. The method of claim 1, further comprising the step of changing a representation of the pointer on the display device from a pointer nominal representation to a pointer movement representation when the user input device is operated to move the pointer in a neighborhood of one of the knob handle and the planar handle, and wherein the pointer movement representation is indicative of a planar movement of the object image when the pointer is in a neighborhood of the planar handle.

3. The method of claim 1, wherein the knob handle as represented on the display device comprises a point connected by a connector to the plane tangent to the sphere.

4. The method of claim 3, wherein the connector is colinear with a radius of the sphere.

5. The method of claim 3, wherein the second type of movement is one of a linear movement and rotation of the object image when the pointer is in a neighborhood of the knob handle.

6. The method of claim 1, further comprising the step of changing a representation of the pointer on the display device from a pointer nominal representation to a pointer movement representation when the user input device is operated to move the pointer in a neighborhood of one of the knob handle and the planar handle, and wherein the pointer movement representation is visually indicative of a potential direction of movement of the displayed object.

7. The method of claim 1, wherein a plurality of sets of object handles are provided on the display device in predetermined positions relative to the movement reference frame.

8. The method of claim 7, wherein three sets of object image handles are provided, each of the object image handle sets being along one a corresponding of mutually orthogonal axes, the axes intersecting at a center of the movement reference frame.

9. The method of claim 1, wherein the movement reference frame is also provided with a frame handle, and wherein actuation of the user input device when the pointer is in a neighborhood of the frame handle enables a displacement of the movement reference frame relative to the displayed object.

10. The method of claim 1, further comprising operating the user input device when the pointer is in the neighborhood of the knob handle to prompt display of an axis of movement on the display device, the axis of movement extending from a region of the knob handle to a predetermined position on the display device relative to the movement reference frame.

11. The method of claim 10, wherein the axis of movement extends through a center of the reference movement frame and extends to a point on the reference movement frame.

12. The method of claim, 10, further comprising:
dragging the pointer across the display device in response to operation of the user input device;
displacing the displayed object across the display device in a manner determined by the dragging of the pointer;
displaying on the display device a vector representing the displacement; and
providing on the display device a numerical indication of an extent of the displacement.

13. The method of claim 10, further comprising:
changing a representation of the pointer on the display device from a pointer first representation to a pointer second representation when the pointer is moved along the axis of movement;
rotating the displayed object about the axis of movement when the user input device is operated while the pointer has the pointer second representation.

14. A method for providing a visually perceptible movement of a displayed object depicted on a display device, the display device having a pointer displayed thereon, the pointer being movable on the display device in accordance with operation of a user input device; the method comprising:
providing a movement reference frame on the display device, the movement reference frame being shown on the display device as a three dimensional sphere, the movement reference frame having at least one object handle set visually provided on the display device, the object handle set comprising both a planar handle and a knob handle the planar handle comprising a bounded geometrical shape in a plane tangent to the sphere;
providing a frame handle on the display device;
using the user input device, when the pointer is moved in a neighborhood of the frame handle, to enter a movement mode;
displacing the movement reference frame relative to the displayed object, during the movement mode, in accordance with actuation of the user input device during the movement mode.

15. The method of claim 14, further comprising confining displacement of the frame handle in accordance with a shape of the displayed object.

16. The method of claim 14, wherein a display of the frame handle on the display device comprises a center point and two rotation points, the center point and two rotation points being depicted on the display as lying in a frame handle plane.

17. The method of claim 14, further comprising changing a representation of the pointer on the display device from a pointer nominal representation to a pointer movement representation when the user input device is operated to move the pointer in a neighborhood of the frame handle.

18. A method for providing a visually perceptible movement of a displayed object depicted on a display device, the display device having a pointer displayed thereon, the pointer being movable on the display device in accordance with operation of a user input device; the method comprising:
providing a movement reference frame on the display device, the movement reference frame being shown on the display device as a three dimensional sphere, the movement reference frame having at least one object handle set visually provided on the display device, the object handle set comprising both a planar handle and a knob handle, the planar handle comprising a bounded geometrical shape in a plane tangent to the sphere;
using the user input device, when the pointer is moved in a neighborhood of the object handle set, to enter a displacement mode;
displacing the image of the object from an original location to a displaced location by dragging a handle of the object handle set in accordance with actuation of the user input device during the displacement mode; then
activating the user input device whereby the image of the object remains at the original location and a copy of the displaced object is generated at the displaced location.

19. The method of claim 18, wherein the activation of the user input device causes the copy of displayed object at the displaced location to be linked to the displayed object at the original image location.

20. An apparatus for providing a visually perceptible movement of a displayed object, the apparatus comprising:
a display device upon which the displayed object is depicted;
a user input device;
a processor which generates a display of the object and a movement reference frame on the display device, the movement reference frame being shown on the display device as a three dimensional sphere, the movement reference frame having at least one object handle set visually provided on the display device, the object handle set comprising both a planar handle and a knob handle, the planar handle comprising a bounded geometrical shape in a plane tangent to the sphere;

wherein the user input device is used to enter an object movement mode;

wherein the processor, during the object movement mode, moves the displayed object through a movement displacement, the movement displacement being a first type of movement when the pointer is in a neighborhood of the planar and a second type of movement when the pointer is in a neighborhood of the knob handle, the displacement movement being in accordance with actuation of the user input device during the object movement mode.

21. The apparatus of claim 20, wherein the processor changes a representation of the pointer on the display device from a pointer nominal representation to a pointer movement representation when the user input device is operated to move the pointer in a neighborhood of one of the knob handle and the planar handle, and wherein the pointer movement representation is indicative of a planar movement of the object image when the pointer is in a neighborhood of the planar handle.

22. The apparatus of claim 20, wherein the knob handle as represented on the display device comprises a point connected by a connector to the plane tangent to the sphere.

23. The apparatus of claim 22, wherein the connector is colinear with a radius of the sphere.

24. The apparatus of claim 22, wherein the movement displacement is one of a linear movement and rotation of the object image when the pointer is in a neighborhood of the knob handle.

25. The apparatus of claim 20, wherein the processor changes a representation of the pointer on the display device from a pointer nominal representation to a pointer movement representation when the user input device is operated to move the pointer in a neighborhood of one of the knob handle and the planar handle, and wherein the pointer movement representation is visually indicative of a potential direction of movement of the displayed object.

26. The apparatus of claim 20, wherein a plurality of sets of object handles are provided on the display device in predetermined positions relative to the movement reference frame.

27. The apparatus of claim 26, wherein three sets of object image handles are provided, each of the object image handle sets being along one a corresponding of mutually orthogonal axes, the axes intersecting at a center of the movement reference frame.

28. The apparatus of claim 20, wherein the movement reference frame is also provided with a frame handle, and wherein actuation of the user input device when the pointer is in a neighborhood of the frame handle enables a displacement of the movement reference frame relative to the displayed object.

29. A computer program product which provides visually perceptible movement of a displayed object on a display device upon which the object is depicted, the program comprising a memory storing computer readable code, the computer readable code being executable on a processor to which information is input via a user input device;

wherein execution of the program generates a display of the object and a movement reference frame on the display device, the movement reference frame being shown on the display device as a three dimensional sphere, the movement reference frame having at least one object handle set visually provided on the display device, the object handle set comprising both a planar handle and a knob handle, the planar handle comprising a bounded geometrical shape in a plane tangent to the sphere;

and wherein in response to operation of the user input device the program enters enter an object movement mode;

wherein, during the object movement mode, the displayed object is moved through a movement displacement, the movement displacement being a first type of movement when the pointer is in a neighborhood of the planar handle and a second type of movement when the pointer is in a neighborhood of the knob handle, the displacement movement being in accordance with actuation of the user input device during the object movement mode.

30. The computer program product of claim 29, wherein execution of the program changes a representation of the pointer on the display device from a pointer nominal representation to a pointer movement representation when the user input device is operated to move the pointer in a neighborhood of one of the knob handle and the planar handle, and wherein the pointer movement representation is indicative of a planar movement of the object image when the pointer is in a neighborhood of the planar handle.

31. The computer program product of claim 29, wherein the knob handle as represented on the display device comprises a point connected by a connector to the plane tangent to the sphere.

32. The computer program product of claim 31, wherein the connector is colinear with a radius of the sphere.

33. The computer program product of claim 31, wherein the movement displacement is one of a linear movement and rotation of the object image when the pointer is in a neighborhood of the knob handle.

34. The computer program product of claim 29, wherein execution of the program changes a representation of the pointer on the display device from a pointer nominal representation to a pointer movement representation when the user input device is operated to move the pointer in a neighborhood of one of the knob handle and the planar handle, and wherein the pointer movement representation is visually indicative of a potential direction of movement of the displayed object.

35. The computer program product of claim 29, wherein a plurality of sets of object handles are provided on the display device in predetermined positions relative to the movement reference frame.

36. The computer program product of claim 35, wherein three sets of object image handles are provided, each of the object image handle sets being along one a corresponding of mutually orthogonal axes, the axes intersecting at a center of the movement reference frame.

37. The computer program product of claim 29, wherein the movement reference frame is also provided with a frame handle, and wherein actuation of the user input device when the pointer is in a neighborhood of the frame handle enables a displacement of the movement reference frame relative to the displayed object.

* * * * *